United States Patent
Detwiler et al.

(10) Patent No.: US 12,073,705 B2
(45) Date of Patent: Aug. 27, 2024

(54) SEPARATION ALERTS FOR NOTIFICATION WHILE TRAVELING

(71) Applicant: Apple Inc., Cupertino, CA (US)

(72) Inventors: Benjamin A. Detwiler, Menlo Park, CA (US); Siva Ganesh Movva, Cupertino, CA (US); Katherine K. Ernst, San Francisco, CA (US); Richard Akira Heru, Mountain View, CA (US); Johan O. Bergerengen, San Francisco, CA (US); Langford M. Wasada, San Francisco, CA (US); Ernst Thomas Erdmann, IV, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 40 days.

(21) Appl. No.: 17/525,779

(22) Filed: Nov. 12, 2021

(65) Prior Publication Data

US 2022/0358830 A1 Nov. 10, 2022

Related U.S. Application Data

(60) Provisional application No. 63/197,317, filed on Jun. 4, 2021, provisional application No. 63/185,926, filed on May 7, 2021.

(51) Int. Cl.
*G08B 21/24* (2006.01)
*H04W 4/02* (2018.01)
(Continued)

(52) U.S. Cl.
CPC .......... *G08B 21/24* (2013.01); *H04W 4/023* (2013.01); *H04W 4/029* (2018.02); *H04W 76/19* (2018.02); *H04W 76/14* (2018.02)

(58) Field of Classification Search
None
See application file for complete search history.

(56) References Cited

U.S. PATENT DOCUMENTS

| 4,918,425 A | 4/1990 | Greenberg et al. |
| 5,910,776 A | 6/1999 | Black |

(Continued)

FOREIGN PATENT DOCUMENTS

| CN | 101682508 | 3/2010 |
| CN | 102325324 | 1/2012 |

(Continued)

OTHER PUBLICATIONS

EP22172663.1, "Extended European Search Report" mailed Jan. 25, 2023, 18 pages.

(Continued)

*Primary Examiner* — Thomas S McCormack
(74) *Attorney, Agent, or Firm* — Aikin & Gallant, LLP

(57) ABSTRACT

Methods to provide separation notifications are described. In an embodiment, movement is detected beyond a threshold distance from a trusted location, in response to the detecting, receiving an indication that at least one accessory device is nearby the electronic device and storing information on a status of a wireless connection with the at least one accessory device, receiving an indication that the electronic device is in transit, monitoring the wireless connection for the at least one accessory device, and upon detection of a lost wireless connection for the at least one accessory device, send a separation notification.

24 Claims, 21 Drawing Sheets

(51) Int. Cl.
  *H04W 4/029*  (2018.01)
  *H04W 76/14*  (2018.01)
  *H04W 76/19*  (2018.01)

(56) References Cited

U.S. PATENT DOCUMENTS

| | | |
|---|---|---|
| 6,292,660 B1 | 9/2001 | Hartless et al. |
| 6,369,706 B1 | 4/2002 | Anderson et al. |
| 7,059,182 B1 | 6/2006 | Ragner |
| 7,274,761 B2 | 9/2007 | Muller et al. |
| 7,342,497 B2 | 3/2008 | Chung et al. |
| 7,376,393 B2 | 5/2008 | Ono et al. |
| 7,388,491 B2 | 6/2008 | Chand et al. |
| 7,558,529 B2 | 7/2009 | Seshadri et al. |
| 7,657,248 B2 | 2/2010 | Hodoshima |
| 8,457,617 B2 | 6/2013 | Sweeney et al. |
| 8,538,401 B2 | 9/2013 | Kim et al. |
| 8,873,758 B2 | 10/2014 | Bradley |
| 9,077,521 B2 | 7/2015 | Machani |
| 9,277,353 B2 | 3/2016 | Merriam |
| 9,277,386 B1 | 3/2016 | Masiero et al. |
| 9,316,717 B2 | 4/2016 | Gicklhorn et al. |
| 9,323,916 B1 | 4/2016 | Wu et al. |
| 9,420,423 B1 | 8/2016 | Mendelson |
| 9,426,749 B2 | 8/2016 | Cordeiro et al. |
| 9,432,802 B2 | 8/2016 | Matsushita et al. |
| 9,462,109 B1 | 10/2016 | Frazier Fields et al. |
| 9,516,620 B1 | 12/2016 | Upp et al. |
| 9,520,045 B2 | 12/2016 | Hawkins |
| 9,544,075 B2 | 1/2017 | Altman et al. |
| 9,565,255 B2 | 2/2017 | Kapoor et al. |
| 9,762,316 B2 | 9/2017 | Kukuiski et al. |
| 9,769,601 B2 | 9/2017 | Zelinka |
| 9,779,596 B2 | 10/2017 | Ingrassia et al. |
| 9,781,106 B1 | 10/2017 | Vitus et al. |
| 9,801,059 B2 | 10/2017 | Ziv et al. |
| 9,820,093 B2 | 11/2017 | Mayor et al. |
| 9,848,075 B1 | 12/2017 | Ahmad et al. |
| 9,922,531 B1 | 3/2018 | Doxey et al. |
| 10,022,066 B2 | 7/2018 | Tomiha |
| 10,022,086 B1 | 7/2018 | Kahn et al. |
| 10,042,595 B2 | 8/2018 | Behzadi et al. |
| 10,110,642 B2 | 10/2018 | Numakami |
| 10,366,692 B1 | 7/2019 | Adams et al. |
| 10,368,378 B2 | 7/2019 | Foster et al. |
| 10,410,485 B2 | 9/2019 | Ingrassia et al. |
| 10,448,211 B1 | 10/2019 | Shen et al. |
| 10,506,517 B2 | 12/2019 | Dai Javad et al. |
| 10,600,310 B2 | 3/2020 | Hawkins |
| 10,667,313 B2 | 5/2020 | Maguire et al. |
| 10,701,203 B2 | 6/2020 | Fiorini et al. |
| 10,771,898 B2 | 9/2020 | Dusan et al. |
| 10,841,736 B1 | 11/2020 | De La Broise |
| 10,855,483 B1 | 12/2020 | Ramesh et al. |
| 10,862,684 B2 | 12/2020 | Hong et al. |
| 10,956,975 B1 | 3/2021 | Abdul Gaffar et al. |
| 10,970,989 B1 | 4/2021 | Quibelan et al. |
| 10,992,755 B1 | 4/2021 | Tran |
| 11,051,105 B2 | 6/2021 | Dusan et al. |
| 11,265,716 B2 | 3/2022 | Klinkner et al. |
| 11,282,351 B2 | 3/2022 | Ingrassia, Jr. et al. |
| 11,310,652 B2 | 4/2022 | Norp et al. |
| 11,606,669 B2 | 3/2023 | Lopatin et al. |
| 11,641,563 B2 | 5/2023 | Lopatin et al. |
| 11,863,671 B1 | 1/2024 | Sierra et al. |
| 11,889,302 B2 | 1/2024 | Victa et al. |
| 2002/0144215 A1 | 10/2002 | Hoskote et al. |
| 2003/0065918 A1 | 4/2003 | Willey |
| 2003/0092437 A1 | 5/2003 | Nowlin et al. |
| 2003/0182584 A1 | 9/2003 | Banes et al. |
| 2005/0021767 A1 | 1/2005 | Cai |
| 2005/0154896 A1 | 7/2005 | Widman et al. |
| 2005/0190098 A1 | 9/2005 | Bridgelall et al. |
| 2005/0285739 A1 | 12/2005 | Velhal et al. |
| 2006/0039337 A1 | 2/2006 | Hodoshima |
| 2006/0111835 A1 | 5/2006 | Baker et al. |
| 2007/0139199 A1 | 6/2007 | Hanlon |
| 2007/0249374 A1 | 10/2007 | Hu et al. |
| 2007/0283395 A1 | 12/2007 | Wezowski |
| 2008/0119953 A1 | 5/2008 | Reed et al. |
| 2008/0120196 A1 | 5/2008 | Reed et al. |
| 2009/0058670 A1 | 3/2009 | Sweeney et al. |
| 2009/0150674 A1 | 6/2009 | Richardson et al. |
| 2009/0315767 A1 | 12/2009 | Scalisi et al. |
| 2009/0323972 A1 | 12/2009 | Kohno et al. |
| 2009/0325599 A1 | 12/2009 | Vuori |
| 2010/0079249 A1 | 4/2010 | Pan |
| 2010/0159833 A1 | 6/2010 | Lewis et al. |
| 2010/0184378 A1 | 7/2010 | Wakefield |
| 2010/0245054 A1 | 9/2010 | Kim |
| 2010/0289620 A1 | 11/2010 | Aminger et al. |
| 2011/0124326 A1 | 5/2011 | Kudo |
| 2012/0054493 A1 | 3/2012 | Bradley |
| 2012/0083209 A1 | 4/2012 | Giles et al. |
| 2012/0275361 A1 | 11/2012 | Berenberg et al. |
| 2012/0310391 A1 | 12/2012 | Sanders |
| 2012/0328061 A1 | 12/2012 | Chow |
| 2013/0023238 A1 | 1/2013 | Kaplan et al. |
| 2013/0111555 A1 | 5/2013 | Leneel |
| 2013/0171986 A1 | 7/2013 | Shimizu |
| 2013/0271902 A1 | 10/2013 | Lai et al. |
| 2013/0275873 A1 | 10/2013 | Shaw et al. |
| 2013/0290191 A1 | 10/2013 | Dischamp et al. |
| 2014/0111307 A1 | 4/2014 | Ingrassia et al. |
| 2014/0222685 A1 | 8/2014 | Middleton et al. |
| 2015/0019124 A1 | 1/2015 | Bandyopadhyay et al. |
| 2015/0072618 A1 | 3/2015 | Granbery |
| 2015/0189596 A1 | 7/2015 | Stephens |
| 2015/0277852 A1 | 10/2015 | Burgis |
| 2015/0289207 A1 | 10/2015 | Kubo et al. |
| 2015/0334569 A1 | 11/2015 | Rangarajan et al. |
| 2015/0356030 A1 | 12/2015 | Zahand et al. |
| 2015/0382140 A1 | 12/2015 | Cho et al. |
| 2016/0006577 A1 | 1/2016 | Logan |
| 2016/0057625 A1 | 2/2016 | Andrada et al. |
| 2016/0069991 A1 | 3/2016 | Das et al. |
| 2016/0080591 A1 | 3/2016 | Asakura |
| 2016/0088143 A1 | 3/2016 | Cohn et al. |
| 2016/0094947 A1 | 3/2016 | Shen et al. |
| 2016/0131490 A1* | 5/2016 | Kimes ................ G01C 21/3667 |
| | | 701/431 |
| 2016/0140335 A1 | 5/2016 | Proulx et al. |
| 2016/0017402 A1 | 6/2016 | Cavallaro et al. |
| 2016/0164973 A1 | 6/2016 | Kapoor et al. |
| 2016/0174023 A1 | 6/2016 | Cavallaro et al. |
| 2016/0180392 A1 | 6/2016 | Liu et al. |
| 2016/0189507 A1 | 6/2016 | Rayner |
| 2016/0205556 A1 | 7/2016 | Borghei |
| 2016/0212538 A1 | 7/2016 | Fullam et al. |
| 2016/0234213 A1 | 8/2016 | Kim et al. |
| 2016/0242192 A1 | 8/2016 | Llosa et al. |
| 2016/0248564 A1 | 8/2016 | Qi et al. |
| 2016/0302137 A1 | 10/2016 | Escott et al. |
| 2016/0330095 A1 | 11/2016 | Numakami |
| 2016/0344712 A1 | 11/2016 | Ding et al. |
| 2016/0352518 A1 | 12/2016 | Ford et al. |
| 2016/0357385 A1 | 12/2016 | Dan et al. |
| 2016/0360350 A1 | 12/2016 | Watson et al. |
| 2016/0371507 A1 | 12/2016 | Jakobsson |
| 2017/0126818 A1 | 5/2017 | Kang |
| 2017/0127340 A1 | 5/2017 | Dooey et al. |
| 2017/0228935 A1 | 8/2017 | Foster et al. |
| 2017/0272415 A1 | 9/2017 | Zhao et al. |
| 2017/0134898 A1 | 11/2017 | Vega et al. |
| 2017/0325065 A1 | 11/2017 | Azam et al. |
| 2017/0330031 A1 | 11/2017 | Wilson et al. |
| 2018/0013815 A1 | 1/2018 | Gold |
| 2018/0025595 A1 | 1/2018 | Ingrassia et al. |
| 2018/0035374 A1 | 2/2018 | Borden et al. |
| 2018/0176748 A1 | 6/2018 | Kim et al. |
| 2018/0183591 A1 | 6/2018 | De Laat et al. |
| 2018/0183596 A1 | 6/2018 | Deshpande et al. |
| 2018/0184286 A1 | 6/2018 | Patterson |
| 2018/0199138 A1 | 7/2018 | Dusan et al. |

(56) References Cited

U.S. PATENT DOCUMENTS

| | | |
|---|---|---|
| 2018/0219872 A1 | 8/2018 | Sugashima et al. |
| 2018/0227284 A1 | 8/2018 | Sugano et al. |
| 2018/0262907 A1 | 9/2018 | Alanis et al. |
| 2018/0288208 A1 | 10/2018 | Lee et al. |
| 2018/0317266 A1 | 11/2018 | Britt et al. |
| 2018/0343561 A1 | 11/2018 | Patterson |
| 2018/0348718 A1 | 12/2018 | Richardson et al. |
| 2019/0028281 A1 | 1/2019 | Turissini et al. |
| 2019/0028445 A1 | 1/2019 | McLaughlin et al. |
| 2019/0034920 A1 | 1/2019 | Nolan et al. |
| 2019/0037469 A1 | 1/2019 | Krishnan et al. |
| 2019/0058966 A1 | 2/2019 | Puppala et al. |
| 2019/0116173 A1 | 4/2019 | Robison et al. |
| 2019/0213528 A1 | 7/2019 | Gupta et al. |
| 2019/0246253 A1 | 8/2019 | Ryu et al. |
| 2019/0289059 A1 | 9/2019 | Vanahalli et al. |
| 2020/0074822 A1 | 3/2020 | Ingrassia, Jr. et al. |
| 2020/0107164 A1 | 4/2020 | Lopatin et al. |
| 2020/0145244 A1 | 5/2020 | Hollinger et al. |
| 2020/0177595 A1 | 6/2020 | Rakshit et al. |
| 2020/0187001 A1 | 6/2020 | Ard et al. |
| 2020/0226908 A1 | 7/2020 | Doxey et al. |
| 2020/0242662 A1 | 7/2020 | Middleton et al. |
| 2020/0314233 A1* | 10/2020 | Mohalik ............... H04W 64/00 |
| 2020/0344549 A1 | 10/2020 | Wegener |
| 2021/0044957 A1 | 2/2021 | Norp et al. |
| 2021/0136846 A1 | 5/2021 | Ponnusamy et al. |
| 2021/0203747 A1 | 7/2021 | Gorsica, IV et al. |
| 2021/0204115 A1 | 7/2021 | Gorsica, IV et al. |
| 2021/0250355 A1 | 8/2021 | Galdo et al. |
| 2021/0256833 A1 | 8/2021 | Daoura et al. |
| 2021/0334851 A1 | 10/2021 | Proctor, Jr. et al. |
| 2021/0400045 A1 | 12/2021 | Kondeti |
| 2022/0052847 A1 | 2/2022 | Gonzalez Cervantes et al. |
| 2022/0070667 A1 | 3/2022 | Victa et al. |
| 2022/0078029 A1 | 3/2022 | Galdo et al. |
| 2022/0200789 A1 | 6/2022 | Lalande et al. |
| 2022/0224300 A1 | 7/2022 | Knode |
| 2022/0256633 A1 | 8/2022 | Gu et al. |
| 2022/0327196 A1 | 10/2022 | Trapani |
| 2022/0369022 A1 | 11/2022 | Jorgovanovic et al. |
| 2022/0386076 A1 | 12/2022 | Lopatin et al. |
| 2022/0394431 A1 | 12/2022 | Lopatin et al. |

FOREIGN PATENT DOCUMENTS

| | | |
|---|---|---|
| CN | 104833945 | 8/2015 |
| CN | 106412816 | 2/2017 |
| CN | 106792501 | 5/2017 |
| CN | 107328424 | 11/2017 |
| CN | 108223229 | 6/2018 |
| CN | 108520552 | 9/2018 |
| CN | 109596118 | 4/2019 |
| CN | 112068512 | 12/2020 |
| CN | 114071357 | 2/2022 |
| EP | 1296155 | 3/2003 |
| EP | 2020784 | 2/2009 |
| GB | 2472192 A | 2/2011 |
| KR | 20140044916 | 4/2014 |
| KR | 20170013833 | 2/2017 |
| KR | 20180086118 | 7/2018 |
| KR | 2019-0141998 A | 12/2019 |
| WO | 2010126846 | 11/2010 |
| WO | 2012030733 | 3/2012 |
| WO | 2013036488 | 3/2013 |
| WO | 2013163334 | 10/2013 |
| WO | 2014005004 | 3/2014 |
| WO | 2014042507 A1 | 3/2014 |
| WO | 2016032610 | 3/2016 |
| WO | 2016036453 | 3/2016 |
| WO | 2017107077 | 6/2017 |
| WO | 2018001518 A1 | 1/2018 |
| WO | 2018118026 | 6/2018 |
| WO | 2018135919 | 7/2018 |
| WO | 2018156555 | 8/2018 |
| WO | 2018160863 A1 | 9/2018 |
| WO | 2019232420 A2 | 12/2019 |
| WO | 2020214701 A1 | 10/2020 |
| WO | 2020214708 A1 | 10/2020 |
| WO | 2020214709 A1 | 10/2020 |
| WO | 2020214711 A1 | 10/2020 |
| WO | 2022046527 | 3/2022 |
| WO | 2022256438 | 12/2022 |

OTHER PUBLICATIONS

PCT/US2021/046786, "PCT Notification of Transmittal of the International Search Report and the Written Opinion of the International Searching Authority, or the Declaration", Mailed Dec. 13, 2021, 14 pages.

Fofa, "Find One, Find All Key Finder & Remote Control Locators", received from The Wayback Machine—https://web.archive.org/web/20200715080402/http://www.findonefindall.com:80/index.htm, 3 pages.

Kim et al., "In/Out Status Monitoring in Mobile Asset Tracking with Wireless Sensor Networks", received from www.mdpi.com/journal/sensors, published Mar. 26, 2010, 22 pages.

Fuemmeler et al., "Energy Efficient Multi-Object Tracking in Sensor Networks", received from https://ieeexplore.ieee.org/document/5439914, published Mar. 29, 2010, 9 pages.

Cocchi et al., "Subband Neural Networks Prediction for On-Line Audio Signal Recovery", received from https://ieeexplore.ieee.org/document/1021887, Published Jul. 2002, 10 pages.

PCT/US2022/027681, "PCT Notification of transmittal of the International Search Report and the Written Opinion of the International Searching Authority, or the Declaration", mailed Jul. 28, 2022, 9 pages.

A. Korolova et al., "Cross-App Tracking via Nearby Bluetooth Low Energy Devices", A presentation proposal for PrivacyCon 2017, Published Mar. 13, 2018, 12 pgs.

PCT/US2020/028318, "PCT Notification of Transmittal of the International Search Report and the Written Opinion of the International Searching Authority, or the Declaration", Mailed Jul. 8, 2020, 16 pages.

PCT/US2020/028326, "PCT Notification of Transmittal of the International Search Report and the Written Opinion of the International Searching Authority, or the Declaration", Mailed Jul. 3, 2020, 12 pages.

PCT/US2020/028327, "PCT Notification of Transmittal of the International Search Report and the Written Opinion of the International Searching Authority, or the Declaration", Mailed Sep. 14, 2020, 17 pages.

PCT/US2020/028329, "PCT Notification of Transmittal of the International Search Report and the Written Opinion of the International Searching Authority, or the Declaration", Mailed Jul. 15, 2020, 13 pages.

Mannan, Mohammad, et al. "Mercury: Recovering forgotten passwords using personal devices." International Conference on Financial Cryptography and Data Security. Springer, Berlin, Heidelberg, 2011 (Year: 2011).

Lopez, Mareo, "The Importance of a Speaker's Resonant Frequency", proaudioland.com, 3 pages, Aug. 2015 (Year: 2015).

Thetileapp.com [online], "Learn How Tile's Tracking Device Helps You Find Your Lost Things," Dec. 9, 2016, retrieved from URL <https://www.thetileapp.com/how-it-works>, 9 pages.

PCT/US2023/017975, "PCT Notification of Transmittal of the International Search Report and the Written Opinion of the International Searching Authority, or the Declaration", mailed Jun. 29, 2023, 12 pages.

* cited by examiner

SEPARATION ALERTS FOR NOTIFICATION WHILE TRAVELING

CROSS REFERENCE TO RELATED APPLICATIONS

This application claims the benefit of U.S. Provisional Application Ser. No. 63/185,926, entitled "Separation Alerts for Notifications while Traveling," filed on May 7, 2021 and U.S. Provisional Application Ser. No. 63/197,317, entitled "Separation Alerts for Notifications while Traveling," filed on Jun. 4, 2021, each of which is hereby incorporated herein by reference.

FIELD

Embodiments described herein relate generally to a system and method of locating wireless devices and accessories.

BACKGROUND

When a device loses a wireless connection with another device, the user may be alerted to the loss of the connection as soon as the wireless connection is lost and without regard for the possibility that the loss of connection is temporary. As a result, prior alerts regarding a loss of wireless connection have been surfaced too frequently and were not meaningful.

SUMMARY

In an embodiment, a method performed by one or more processors of an electronic device to provide separation notifications, the method provides detecting movement beyond a threshold distance from a trusted location, in response to the detecting, receiving an indication that at least one accessory device is nearby the electronic device and storing information on a status of a wireless connection with the at least one accessory device, receiving an indication that the electronic device is in transit, monitoring the wireless connection for the at least one accessory device, and upon detection of a lost wireless connection for the at least one accessory device, send a separation notification.

In an embodiment, a method performed by one or more processors of an electronic device to provide separation notifications, the method provides detecting movement beyond a threshold distance from a trusted location, in response to the detecting, receiving an indication that at least one accessory device is nearby the electronic device and storing information on status of a wireless connection with the at least one accessory device, receiving an indication that the electronic device is located in a known location and monitoring a geofence for the known location, upon receipt of an indication of crossing the geofence boundary, monitoring the wireless connection for the at least one accessory device, and upon detection of a lost wireless connection for the at least one accessory device, send a separation notification.

In an embodiment, a method performed by one or more processors of an electronic device to provide separation notifications, the method provides detecting movement beyond a threshold distance from a trusted location, in response to the detecting, receiving an indication that at least one accessory device is nearby the electronic device and storing information on the at least one accessory device, receiving an indication that the electronic device is in transit, and upon detection of crossing a geofence boundary for the trusted location, increasing a rate of a beacon scan, and upon receipt of beacon data, send a separation notification if beacon data does not indicate the at least one accessory device is nearby.

In an embodiment, a method performed by one or more processors of an electronic device to provide separation notifications, receiving an indication located at a known location, receiving an indication that at least one accessory device is nearby the electronic device and storing information on the at least one accessory devices, upon detection of crossing a geofence boundary for the known location, increasing a rate of a beacon scan for a defined period of time, and upon receipt of beacon data, sending a separation notification if beacon data does not indicate the at least one accessory device is nearby.

DETAILED DESCRIPTION

Embodiments described herein provide techniques to enable separation notifications and locator services for lost or misplaced devices or items. In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

Figure 1:
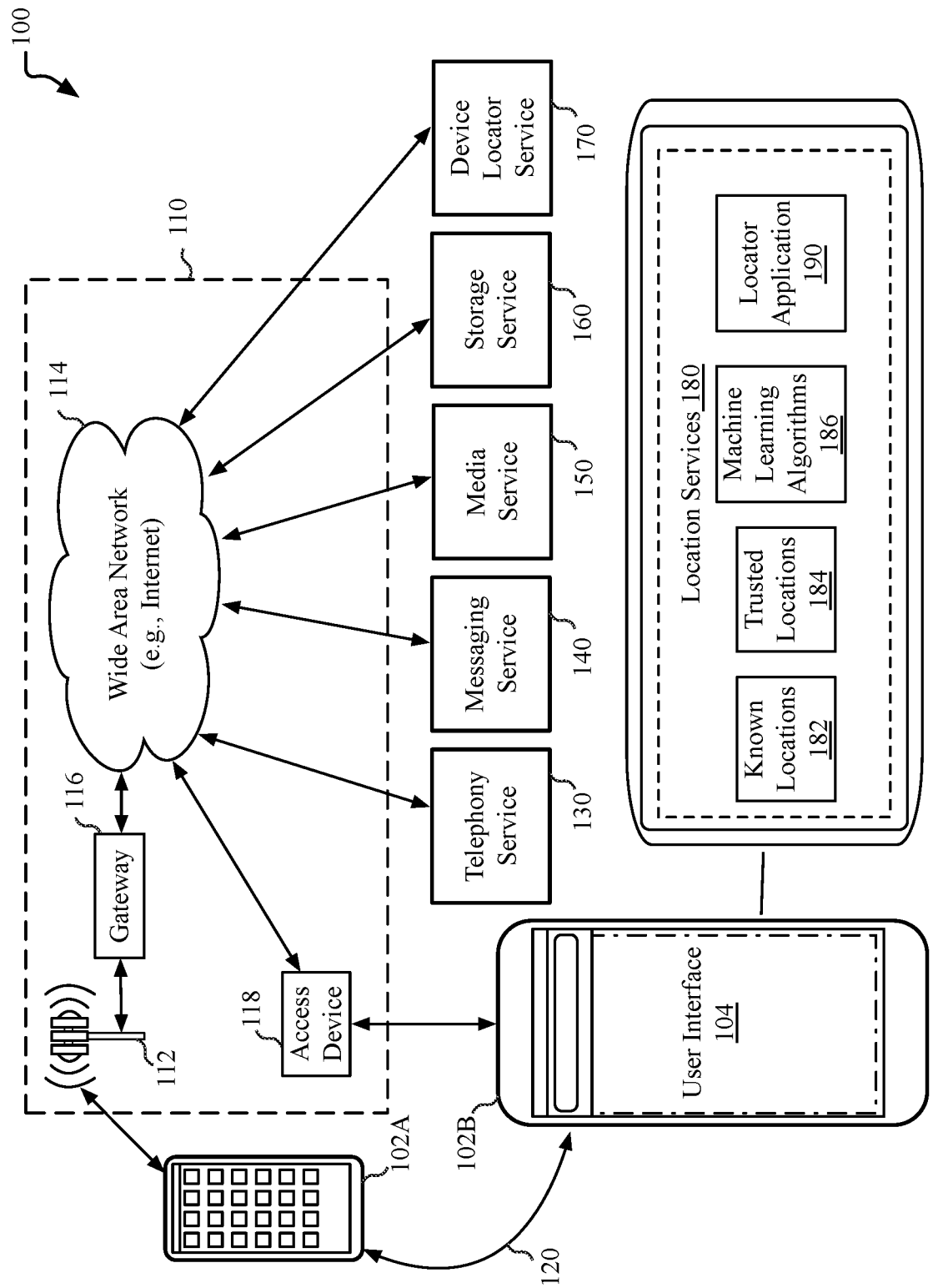
FIG. 1 is a block diagram of a network operating environment for mobile devices, according to an embodiment.

FIG. 1 is a block diagram of a network operating environment 100 for mobile devices, according to an embodiment. The network operating environment 100 includes multiple mobile devices, such as an accessory device with mobile device 102A and mobile device 102B. The mobile devices 102A-102B can each be any electronic device capable of communicating with a wireless network and a wireless accessory device. Some example mobile devices include but are not limited to a smartphone, a tablet computer, a notebook computer, a wearable computer (e.g., smartwatch or other wearable computing accessory), a mobile media player, a personal digital assistant, earpods, locator tags, headphones, head mounted display, health equipment, and other similar devices. Each of mobile device 102A and mobile device 102B optionally can include a user interface, such as user interface 104 of mobile device 102B. In other embodiments, mobile device 102A, as an accessory device, may not have a user interface. Mobile device 102A may be a third-party device that utilizes an application programming interface to access device locator services. The third-party device may be provided by a different device manufacturer or be part of a different ecosystem (e.g., operating system) from mobile device 102A and 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with one or more services, such as a telephony service 210, a messaging service 140, a media service 150, a storage service 160, and a device locator service 170 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files. The device locator service 170 can enable a user to locate a lost or misplaced device that was, at least at some point, connected to the one or more wired and/or wireless networks 110. Other services can also be provided, including a software update service to update operating system software or client software on the mobile devices. In one embodiment, the messaging service 140, media service 150, storage service 160, and device locator service 170 can each be associated with a cloud service provider, where the various services are facilitated via a cloud services account associated with the mobile devices 102A-102B.

Mobile device 102A-102B may have applications, services, and functionality locally accessible on the devices including location services 180. In particular, devices 102A-102B may have a device locator application (e.g., a "Find my" application) 190 to utilize device locator services 170 and location services 180. Locally accessible data may be stored on known locations 182 and safe or trusted locations 184. In some instances, machine learning algorithms 186 may be used to identify known locations 182, and/or trusted locations 184. Although cluster analysis is provided as an example of machine learning algorithms that may be used, those with skill in the art will recognize that other algorithms may be used to identify potential known or trusted locations. By way of example, cluster data analysis may be used to identify and classify and provide semantic labels for locations, such as locations frequented by a user. Particular safe or trusted locations 184 may be designated explicitly or confirmed as such by a user of the device 102A-B after data analysis. In other instances, the known locations 182 or the trusted locations 184 may be classified offline and provided by device locator service 170 or a third-party (e.g., a database with map information).

On-device heuristics and/or machine learning models may be used to infer relationships between a user and locations based on analysis of the locally stored data of frequented locations. For example, a frequently visited location such as a home, a vehicle, a workplace, and/or any other location may be designated as a trusted location 184 by the user. Known locations 182 may be business locations, public spaces, parks, museums, and/or any other location that may be frequented by a user. Boundary information for the respective stored locations may be stored along with classification type for the location and any semantic label assigned to the location. Stored information may include a defined set of boundaries or a radius distance around a point location to allow for creation of a geofence for the location. The geofence is a virtual perimeter for a real-world geographic area. Global positioning system (GPS) may be used to create a virtual fence around a location and track the physical location of the mobile device 102A-B within the geofence boundary as well as entry and exit of the bounded area.

Machine learning algorithms 186 may include on-device heuristics, machine learning algorithms, or a combination thereof to analyze and assign a label regarding movement or travel of a device to be designated as being "in transit" state or "settled" state in a particular location for a period of time. Analysis may be performed using a variety of signals from data sources available to the mobile device 102B, including, but not limited to, the following: sensor data, positioning data, calendar data, transit card usage data, application data, historical data on patterns/routines of travel, and/or any other data accessible to the mobile device 102B. In some embodiments, a mobile device 102B may be classified with a "settled" semantic label after remaining within the geographic boundaries that define a location (e.g., the trusted location 184) for a defined period of time. In the simplest case, positioning data for the mobile device 102B may remain within the boundaries of a geofence for a particular location for a duration of time (e.g., 5 minutes). Sensor data, such as accelerometer data, may indicate that the mobile device 102B is at rest to support an inference of being settled. Application data may support the inference that the mobile device 102B is settled, such as the mobile device being located at a calendar appointment location. Application data indicating a type of application in use may also provide an inference of the device being settled, such as using a media application. Historical data for the user on routines or patterns in travel may be used to determine whether the mobile device 102B is settled, such as a bedtime routine at a home or hotel location. Mobile device 102B may be classified as with an "in transit" label based on prior behavior, patterns, or routines for the user and analyzed on mobile device 102B. For example, the user may have routine of going to work around the same time every day and an "in transit" state may be assigned if the data on the device supports that the pattern is being repeated. In the simplest case, a speed at which the mobile device is moving or entering and exiting known geographic areas (e.g., using geofences) may allow for the inferring that the mobile device 102B is in transit. If the mobile device 102B is detected as accelerating in known areas of transit (e.g., on roads, highways, train routes, etc.), then the mobile device 102B may be given the status of "in transit." Similarly, if transit applications/cards are used/in use, then the mobile device 102B may be designated as "in transit".

Figure 2:
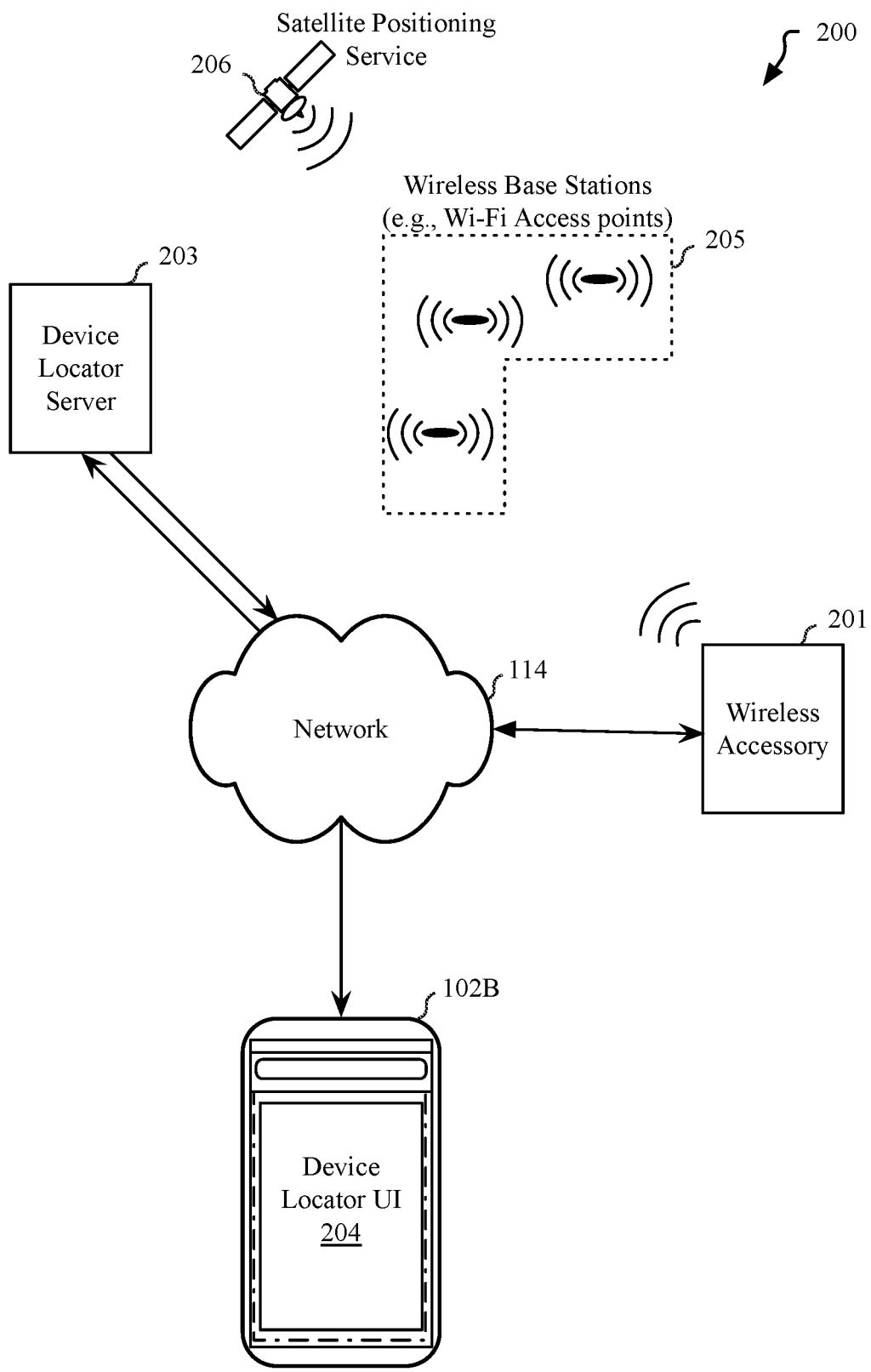
FIG. 2 illustrates a system to locate a wireless accessory, according to an embodiment.

FIG. 2 illustrates a system 200 to locate a wireless accessory 201, according to an embodiment. In one embodiment, the wireless accessory 201 is an accessory device 102A and includes one or more wireless transceivers and can communicate, either directly or indirectly (e.g., through another device or computer) with a companion device (e.g., mobile device 102B) over a wireless network or peer-to-peer communication link. Some examples of wireless accessory devices include but are not limited to wireless earbuds, headphones, headsets, fitness equipment, and other wearable devices (e.g., smartwatches, fitness bands, optical head-mounted displays). The wireless accessory 201 can also include other wireless devices such as game controllers or remote controls. The wireless accessory 201, in one embodiment, also includes smartphones, tablet computers, laptop computers, smart speaker devices, televisions, or television set top boxes that at least temporarily are unable to access a wide area network, such as the Internet (e.g., wide area network 114 as in FIG. 1). The wireless accessory can also be any other wireless device, including beacons or locator tags that can be attached to other devices to enable the tracking or locating of those devices. In one embodiment, the wireless accessory 201 can be paired with the mobile device 102B using a wireless technology standard, such as but not limited to Bluetooth. The wireless accessory 201 can also communicate with the mobile device 102B over wireless technologies such as Wi-Fi direct, Zigbee, or AirPlay. While the companion device to which the wireless accessory 201 is paired is generally referred to as a mobile device 102B, companion devices are not limited to mobile devices. Companion devices, in some embodiments, can also include laptop or desktop devices and can additionally include some wearable accessories, such as but not limited to a smart watch device or a wearable display.

In one embodiment, the wireless accessory 201 can periodically transmit a wireless beacon signal. The wireless accessory 201 can transmit the beacon signal using one of a variety of wireless technologies described herein (e.g., Bluetooth, Wi-Fi, etc.) and in one embodiment can also beacon using an ultra-wide band (UWB) radio technology. The beacon signal can be transmitted using a single wireless technology, one of multiple selectable wireless technologies, or multiple simultaneous wireless technologies. The beacon signal can transmit a beacon identifier that includes information to specifically identify the wireless accessory 201. In one embodiment, the beacon identifier is a public encryption key associated with the device.

The beacon signal can also convey information about the wireless accessory 201, such as a beacon type, device classification, battery level. In one embodiment the beacon signal can also convey device status, such as a lost status, alarm status, separated from owner, or a near-owner status. The beacon signal can also include information that specifies battery life, charging status, and/or other status information. The lost or "separated from owner" status can indicate that the wireless accessory 201 has determined itself to be lost or has been placed into a lost state by the owner of the device. The alarm status can indicate that the wireless accessory 201 was placed in a state that the device should trigger an alarm if moved from a current location. The near-owner status can indicate that the wireless accessory 201 has detected the nearby presence of the mobile device 102B associated with the owner of the accessory.

In some embodiments, the beacon signal can be detected by a finder device (not shown), which is locally proximate to the wireless accessory 201 in order to use crowdsourcing to locate a lost wireless accessory 201. The finder device can be a similar device as the mobile device 102B and can receive and transmit data over a wide area network 114 and/or receive and transmit using similar wireless technologies as the wireless accessory 201 (e.g., Bluetooth, etc.). In particular, the finder device can receive data using the wireless protocol over which the beacon signal is transmitted. The finder device can determine a location using one or more location and/or positioning services including, but not limited to a satellite positioning service 206 or a terrestrial positioning system using RF signals received from wireless base stations 205 such as Wi-Fi access points or cell tower transmitters of a cellular telephone network. In an embodiment, the finder device periodically stores its location as determined based on the one or more location and/or positioning services. The stored location can be associated with a timestamp for which the location was determined. When the finder device receives a beacon signal from the wireless accessory 201, the finder device can transmit a location for the finder device over the wide area network 114 to a device locator server 203. The timestamp for a determined location for the finder device can be correlated with a timestamp for which a beacon signal was received to associate a geographic location with a received beacon signal.

Where the wireless accessory 201 provides a public key within the beacon signal, the finder device can encrypt the determined location data and transmit the encrypted location data to the device locator server 203 over the wide area network 114. In one embodiment, additional data can either be encrypted and transmitted along with the location data or transmitted unencrypted to the device locator server 203. For example, a received signal strength indicator (RSSI) for the beacon signal can be transmitted along with the location data. The RSSI data can then be used to determine the distance of the wireless accessory 201 from the finder device and assist in triangulation on the owner device. Where the RSSI data is transmitted in an unencrypted state, in one embodiment the server can use RSSI information to reduce noise by discarding very weak signals if other, stronger signals are present. In one embodiment, UWB ranging data can also be provided, where such data is available.

In one embodiment, the finder device can behave differently upon receiving a beacon signal from a wireless accessory 201 depending upon a device status conveyed by the wireless accessory 201. For standard beacon signals, the finder device can place encrypted location data into a queue and transmit the location data to the device locator server 203 during a periodic transmission window. However, if the wireless accessory 201 is indicating an alarm state, the finder device can transmit the location data to the device locator server 203 immediately. Additionally, the finder device may not transmit the location data to the device locator server 203 if the beacon signal of the wireless accessory 201 indicates that the accessory is near the owner of the accessory. Alternatively, the finder device may delay transmission of encrypted location data.

If the owner of the wireless accessory 201 wishes to locate the wireless accessory, the owner can access a device locator user interface 204 on the mobile device 102B. The device locator user interface 204 can be associated with a device locator application that is used to locate electronic devices and accessories that are registered with an online account of the user, such as a cloud services account or another type of online account. The device owner, using the device locator UI 204, can query the device locator server 203 for location data that may have been transmitted to the device locator server by a finder device of the wireless accessory 201. In one embodiment, the mobile device 102B can transmit the public encryption key associated with the wireless accessory 201 to the device locator server 203. The device locator server 203 can then return any stored location data that corresponds with the public encryption key. The location data returned to the mobile device 102B can be encrypted data that is encrypted by the finder device using the public encryption key. The mobile device 102B can use an associated private key to decrypt the encrypted location data. The decrypted location data can then be processed by the mobile device 102B to determine a most probable location for the wireless accessory 201. In various embodiments, the most probable location for the wireless accessory 201 can be determined by triangulation from multiple received locations and using other data, such as a beacon signal RSSI associated with each location and timestamp or UWB ranging data included within the location data.

Figure 3:
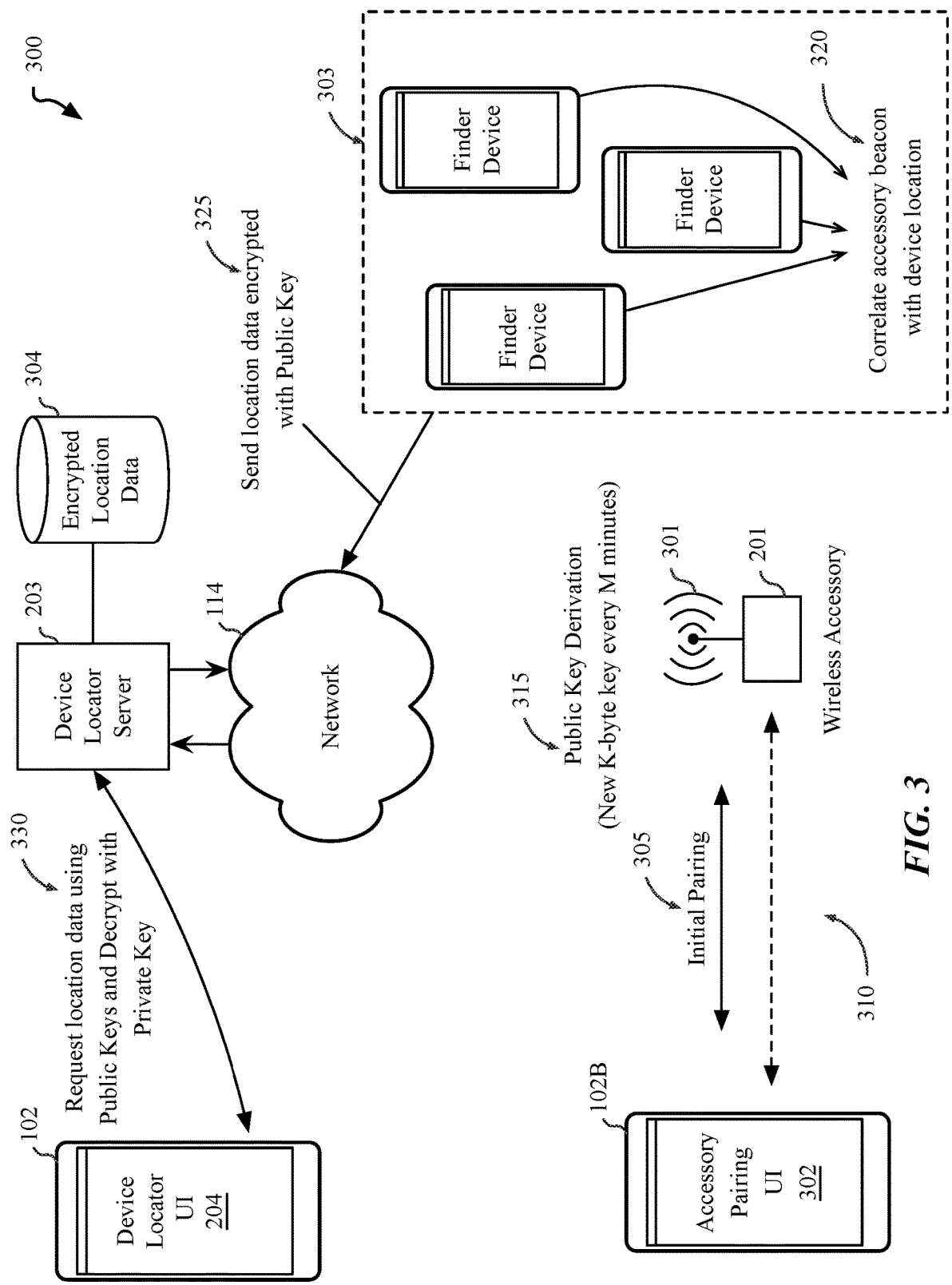
FIG. 3 illustrates a system for pairing and locating a wireless accessory, according to embodiment.

FIG. 3 illustrates a system 300 for pairing and locating a wireless accessory, according to embodiments described herein. In one embodiment a mobile device 102B of a user of the wireless accessory 201 (e.g., example of device 102A) can present an accessory pairing UI 302 by which the user can pair the mobile device 102B with the wireless accessory 201. During an initial pairing (305) between the mobile device 102B and the wireless accessory 201, a public key exchange (310) can be performed between the mobile device and the wireless accessory 201. In one embodiment, during the public key exchange (310) the mobile device 102B and the wireless accessory 201 exchange public keys of public key pairs generated by the device and the wireless accessory 201. In one embodiment the public key exchange (310) is a one-way transfer, in which the mobile device 102B transmits a public key of a public/private key pair to the wireless accessory 201. Alternatively, or additionally, the public key exchange (310) may be a Diffie-Hellman key exchange in which the device and the accessory establish a shared secret between two parties. In one embodiment, the public key exchange (310) additionally uses elliptic curve cryptography to establish the shared secret. For example, Elliptic-curve Diffie-Hellman (ECDH) can be used to enable the establishment of a public key pair and one or more shared secrets. In one embodiment, the one or more shared secrets include an anti-tracking secret, which can the wireless accessory 201 to periodically derive additional public keys.

After the wireless accessory 201 has been paired with the mobile device 102B, the wireless accessory 201 can periodically broadcast a beacon signal 301 that includes device status information and a beacon identifier. In one embodiment the beacon identifier is a public key derived from a shared secret that is established during the public key exchange (310). Additionally, the wireless accessory 201 can periodically perform a public key derivation (315) to generate a new public key and begin broadcasting the new public key as the beacon identifier. The public key is a K-byte key, with a new K-byte key generated every M minutes. The value K and M can vary between embodiments. In one embodiment, a K value of 28 bytes is used. In one embodiment, a K value of 27 bytes is used. The value K can be determined at least in part based on the beacon length associated with the wireless protocol used to transmit the beacon signal 301. In one embodiment, the beacon signal can transmit a variant of beacon advertisement packet associated with a low-energy radio protocol, such as Bluetooth Low Energy.

The value M, in one embodiment, is 15 minutes, such that a new K-byte key is generated every 15 minutes. The public key can be derived deterministically based on a timestamp and an anti-tracking secret generated during the public key exchange 310. The public key derivation (315) process enables the wireless accessory 201 to use different keys over time, preventing the long-term association with a specific key with a specific device. The key can be derived based on an anti-tracking secret known only to the mobile device 102B and the wireless accessory 201, allowing the mobile device 102B, and only the mobile device, to determine which public key will be broadcast by the wireless accessory 201 at any given timestamp. The anti-tracking secret can be generated along with an ECDH public key and transferred to the wireless accessory 201. The anti-tracking secret can then be used to enable the wireless accessory 201 to generate a sequence of public keys $P_i$. In one embodiment, the sequence of public keys $P_i = \lambda_i \cdot P$, which defines a group operation between a scalar or exponent value $\lambda_i$ and group elements, such as, for example, Elliptic Curve points P. The scalar or exponent value $\lambda = KDF(AT, i)$, where KDF is a key derivation function, AT is the anti-tracking secret, and i is a counter or timestamp.

In one embodiment, backtracking resistance can be enabled to protect the anti-tracking secret in the event the wireless accessory 201 is compromised. When backtracking resistance is enabled, the anti-tracking secret is transferred to the wireless accessory 201 but is not retained by the wireless accessory. Instead, the accessory computes a value $\lambda_{i+1} = H(\lambda_i \| time)$, with $\lambda_0 = AT$ and H being a cryptographic hash function. The wireless accessory 201 then stores $\lambda_i$ for a given time period i. If the wireless accessory 201 is compromised, only $\lambda_i$ for current and future values of i is exposed, without exposing the anti-tracking secret AT. In one embodiment, backtracking resistance is performed by periodically writing $\lambda_i$ to non-volatile memory of the wireless accessory 201.

In one embodiment the wireless accessory 201 can transmit the beacon signal 301 every two seconds, although other beacon rates can be used, and the beacon rate can vary under certain circumstances. For example, the wireless accessory 201 can decrease a beacon rate when in a near-owner state. Beacon rate can also vary based on accelerometer triggered events. For example, the wireless accessory 201 can increase the beacon rate when in an alarm state, which can be triggered by the accelerometer on the wireless accessory 201.

The wireless accessory 201 can enter the near-owner state if, after transmitting the beacon signal 301, the wireless accessory 201 receives a reply from the mobile device 102B associated with the user of the accessory, which indicates that the mobile device 102B is within range of the wireless accessory. Additionally, while the wireless accessory is in the near-owner state, the amount of data transmitted by the beacon signal 301 may be reduced. In one embodiment, the rate at which new public keys are generated can also be reduced while the wireless accessory is in the near-owner state.

The wireless accessory 201 can enter an alarm state upon receiving a message from the mobile device 102B that indicates that the wireless accessory 201 should enter the alarm state. When in the alarm state, the wireless accessory can initially enter an armed state in which the wireless accessory 201 can reduce or cease the transmission of locator beacon signals, although other types of wireless signaling can persist. The wireless accessory 201 can remain in the armed state until the state is deactivated by the mobile device 102B or alarm is triggered. The alarm can be triggered, in one embodiment, upon detection of movement, for example, via an accelerometer within the wireless accessory 201. The alarm can also be triggered, in one embodiment, upon detection that the wireless accessory has moved out of range of the mobile device and is no longer in the near-owner state. When the alarm is triggered, the rate at which the beacon signal 301 can be increased, to increase the speed by which the wireless accessory 201 can be located.

The beacon signal 301 transmitted by the wireless accessory 201 can be detected by a set of finder devices 303 and/or the mobile device 102B, which are other electronic devices that can receive the beacon signal transmitted by the wireless accessory and are transmit location and other data associated with the beacon signal 301 to the device locator server 203 via the wide area network 114. In one embodiment the set of finder devices 303 include variants of the mobile device 102B or can be other types of electronic devices. For example, the set of finder devices can perform operations (320) to correlate the beacon signal 301 received from the wireless accessory 201 with a device location associated with the finder device. As described with respect to FIG. 2, the device location can be determined via a satellite positioning service or a terrestrial positioning system that uses RF signals received from wireless base stations (e.g., Wi-Fi access points or cell tower transmitters). In one embodiment the set of finder devices 303 can also include stationary devices such as smart speaker devices, televisions, or television set top boxes that can receive the beacon signal 301.

The set of finder devices 303 can encrypt the location data with the beacon identifier (e.g., public key) received within the beacon signal 301 and send the location data (325) to the device locator server 203. The data sent by the set of finder devices 303 is send anonymously and no identifying information for the finder devices is stored with the data sent by the finder devices.

The device locator server 203 can store encrypted location data in a data store 304, which in one embodiment can be a distributed database having multiple nodes. Hashes of the beacon identifier/public key of an accessory can be sent along with encrypted location data. The encrypted location data can be stored to a database node based on a hash of the beacon identifier. The encrypted location data can be indexed by the device locator server 203 using the hash of the beacon identifier. Sending the hash of the beacon identifier instead of the full beacon identifier prevents the storage of the full beacon identifier to the server. Other information can also be sent and stored with the location data, either in an encrypted or unencrypted state. The other information can include timestamps for when the beacon signal 301 was received, RSSI information for the received beacon, and/or ranging information determined, for example, via UWB ranging.

When the user or owner of the wireless accessory 201 wishes to locate the accessory, the user or owner can access the device locator UI 204 on the mobile device 102B. The device locator UI 204 can be associated with a locator application 190 or feature of the mobile device 102B. The device locator UI 204 may also have a web-based interface that can be accessed from the mobile device 102B or another type of electronic device, such as a laptop or desktop device. The mobile device 102B, upon loading the device locator UI 204, can send a request (330) for location data to the device locator server 203. The request 330 can include a set of public keys or public key hashes, which can serve as beacon identifiers for the beacon data. The mobile device 102B can generate the set of public keys based on the secret information held by the mobile device 102B and the wireless accessory 201 and the timestamps over which the mobile device 102B wishes to receive location data. In one embodiment the set of public keys is the sequence of public keys $P_i$ that are generated based on the anti-tracking secret. The sequence of public keys $P_i$ corresponds to a matching sequence of private keys $d_i$. The mobile device 102B can generate the sequence of public keys, as well as the corresponding sequence of public keys $d_i$, where i is a counter or timestamp. In one embodiment, the mobile device 102B can generate and send the previous 24 hours of public keys (or hashes of the 24 hours of public keys) within the request 330. If no data is found for 24 hours of public keys, the mobile device 102B can send generate keys for an earlier period, back to a pre-determined location data retention limit.

In one embodiment the encrypted location data is stored and indexed based on a hash of the public key instead of the public key to prevent the provider of the location service data from storing data that can be used to tie the encrypted location data to a specific device, and thus a specific user or user account. The finder device can send the hash of the public key that is broadcast within the beacon signal 301 associated with an observation location. The owner of the device can query the device locator server 203 using a hash of the public key that is determined for a query period.

In some embodiments, if a location query is to be performed via the web-based interface from an electronic device, such as a laptop or desktop device, keys to enable the decryption of the location data may be required to be sent to the electronic device. In one embodiment, decryption keys for the location data may be sent to the server that provides the web-based interface to enable the server to decrypt location data, at least while the location data is being viewed through the web-based interface. Before location data is displayed via the web-based interface, a notice may be presented to inform the user that location decryption keys are being temporarily shared with the web-based interface server to enable location data to be decrypted and presented. In one embodiment, the sharing of the location decryption keys can be performed via an automatic and temporarily delegation of location query rights with a proxy account associated with the web-based interface.

In one embodiment, the wireless accessory 201 can be placed in a light lost mode. In the light lost mode, a set of future public keys can be generated for the wireless accessory and transmitted to the device locator server 203. The device locator server 203 can then notify the mobile device 102B if any location data is received that correspond with a key in the set of future public keys. In one embodiment, a finder device that sends a location for a wireless accessory that is in the light lost mode can be directed by the device locator server 203 to relay a message to the wireless accessory 201 that notifies the wireless accessory that it is in the light lost mode. A similar mechanism can be used to relay a message to the wireless accessory 201 that places the accessory in an explicit lost mode. The explicit lost mode can be enabled by the user via the device locator UI 204. In the explicit lost mode, the wireless accessory 201 cannot be paired with another device unless unlocked by the owner. Additional examples of paired devices using location services may be found in U.S. patent application Ser. No. 16/543,227 filed Aug. 16, 2019 entitled "A System and Method for Locating Wireless Accessories," which is incorporated by reference herein in its entirety.

Figure 4:
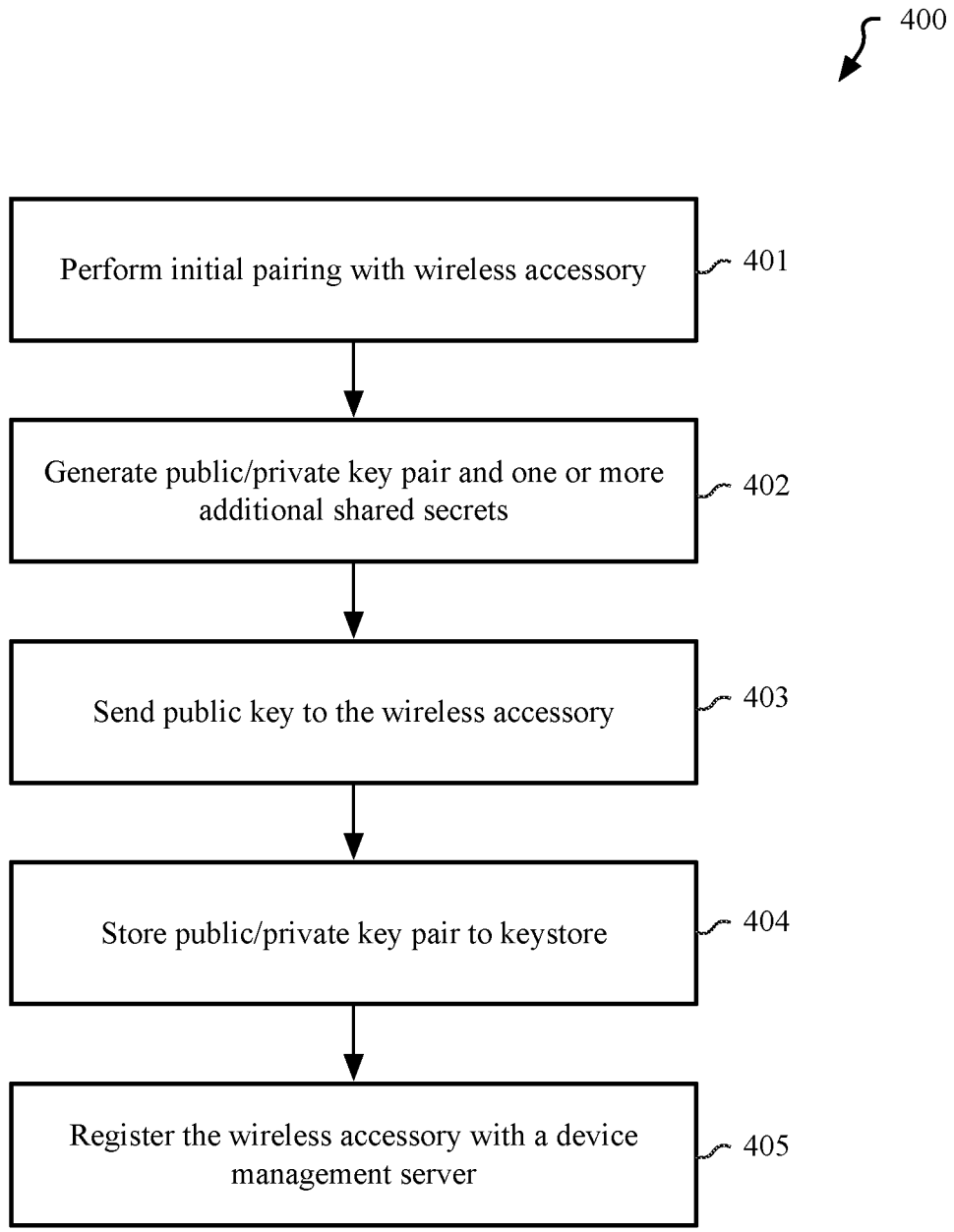
FIG. 4 is a flow diagram illustrating methods for use with the device locator systems, according to an embodiment.

FIG. 4 is a flow diagrams illustrating methods for use with the device locator systems described herein. FIG. 4A illustrates a method 400 to pair a mobile device with a wireless accessory. Aspects of the description of the operations below refers to the mobile device 102B, wireless accessory 201 (e.g., 102A) and device locator server 203.

As shown in FIG. 4, method 400 includes an operation (block 401) that performs an initial pairing with a wireless accessory. The initial pairing can be a Bluetooth pairing or another type of pairing using other wireless radio technologies. During the initial pairing, the mobile device and the wireless accessory can exchange identifiers, passkeys, or other credentials that enables a wireless data exchange to be performed between a mobile or another electronic device and the wireless accessory. On one embodiment the initial paring with the wireless accessory can include the exchange of credentials associated with the wireless protocol for which the pairing is performed, allowing all data exchanged wirelessly to have at least a first layer of encryption.

The mobile device can then generate a public/private key pair and one or more additional shared secrets (block 402). The device can then send the public key and one or more additional shared secrets to the wireless accessory (block 403). A variety of key generation techniques can be used. In one embodiment, a variant of ECDH is used to generate a public key pair for encryption. In one embodiment, the one or more additional shared secrets can include an anti-tracking secret that enables the wireless accessory to derive a new public key based on an existing public key.

After generating the public/private keypair and one or more additional shared secrets, the mobile device can store public/private key pair to keystore (block 404). In one embodiment the keystore is a cloud-based keystore that can be synchronized with other devices associated with the same cloud services account, or family of cloud services accounts, to which the mobile device and wireless accessory are associated. The cloud-based keystore allows the wireless accessory to be located by other synchronized devices. The mobile device can then register the wireless accessory with a device management server (block 405). Registering the wireless accessory with the device management server can form an association between the wireless accessory and the cloud services account to which the mobile device is associated. The device management server can be associated with other cloud-based servers that are used to facilitate cloud-based services accessible to the mobile device, such as the device locator server 203 of FIG. 2 and FIG. 3. Additional examples of paired devices using location services may be found in U.S. patent application Ser. No. 16/543,227 filed Aug. 16, 2019 entitled "A System and Method for Locating Wireless Accessories," which is incorporated by reference herein in its entirety.

Figure 5:
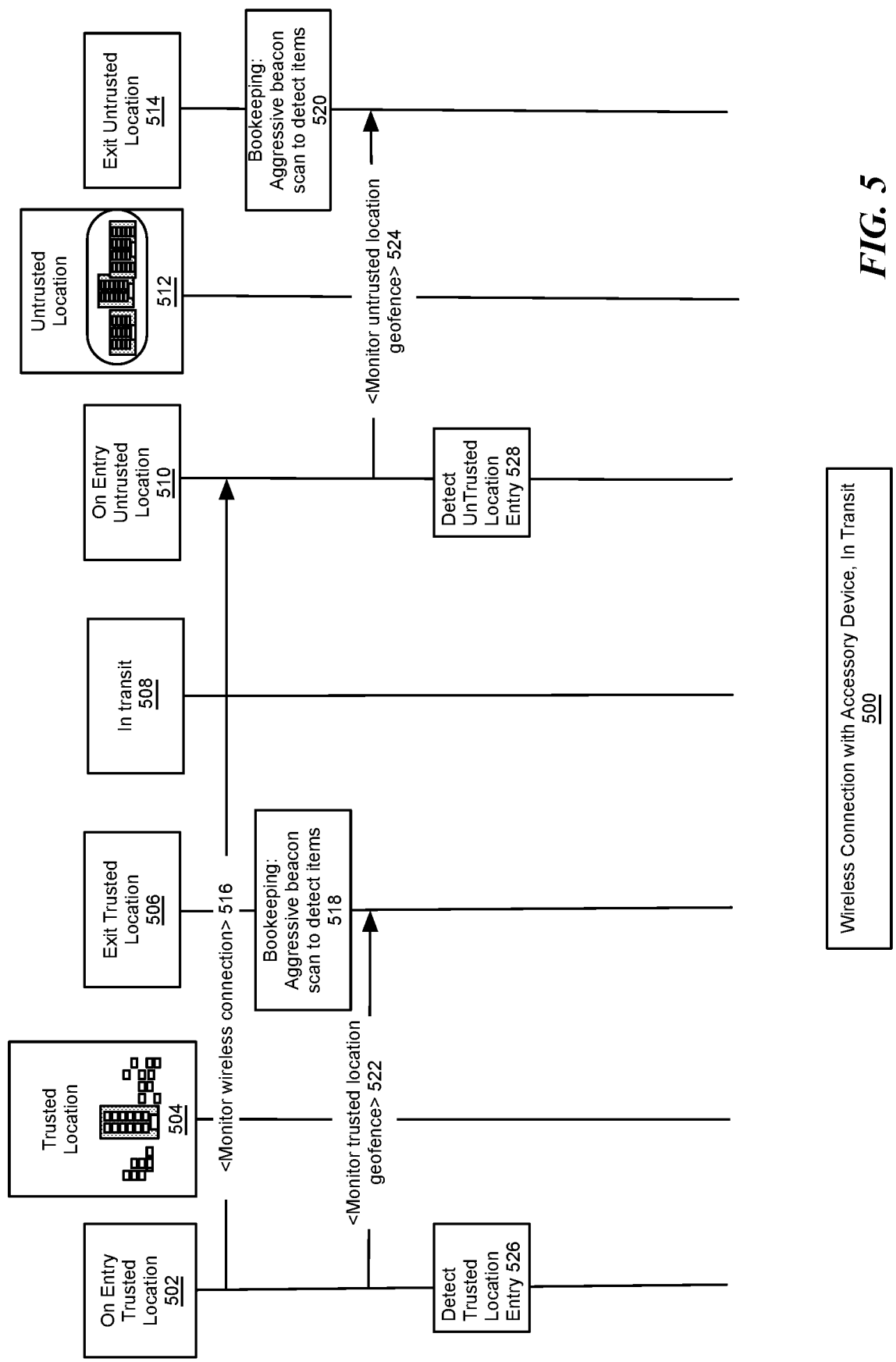
FIG. 5 is a timeline for provision of separation notifications while a mobile device is in transit, according to an embodiment.

FIG. 5 is a timeline 500 for provision of separation notifications while mobile device 102B is in transit, according to an embodiment. In an embodiment, mobile device 102B is paired and has a wireless connection, such as a Bluetooth connection, with accessory device 102A. As such, accessory device 102A may be described as being "leashed" to mobile device 102B. Separation notifications may be provided for the leashed accessory device 102A while in transit, if the accessory device 102A exits a trusted location 506 with mobile device 102B.

Entry to a trusted location 502 may be detected 526 when the mobile device 102B crosses a boundary for a geofence defined and monitored for the trusted location 522, in an embodiment. As indicated above, trusted locations and untrusted locations information may be accessible on the mobile device 102B. When a determination is made from positioning information (e.g., GPS) for the mobile device 102B that the mobile device 102B has entered the trusted location, the geofence for the trusted location may be established and monitored. In some embodiments, one or more signals may be used to determine whether the mobile device 102B entered a location, is in a "settled" state at a location, exited the location, or is in a "in transit" state from/to a location. On entry to the trusted location 502, the wireless connection between accessory device 102A and mobile device 102B may be monitored 516. The wireless connection may continue to be monitored 516 while mobile device 102B leaves the trusted location 504 and is traveling (e.g., "in transit" state) to an untrusted location 512.

When movement is detected beyond a threshold distance from the trusted location 506 after crossing the geofence border for the trusted location, the mobile device 102B may be characterized as having exited the trusted location and is in the "in transit" state 508 by the classifier. Bookkeeping 518 may be performed to determine each of the accessory devices 102A that are near the mobile device 102B upon exit of the trusted location 506 and traveling with the mobile device 102B while in the "in transit" state. Bookkeeping may involve recording a status of wireless connection between the mobile device 102B and each accessory device 102A determined to be with the mobile device 102B upon exit 506. A beacon scan may be performed at increased rate in addition to monitoring each wireless connection to determine each device that is in transit with the mobile device 102B. In particular, received beacon data from the beacon scan 518 may contain a packet from accessory device 102A with a status (e.g., near-owner, separated from owner, etc.) for at least one accessory device 102A. Some embodiments may provide for storage of positioning information associated with a last status for an accessory device 102A.

The wireless connection with the accessory device 102A may be monitored 516, and upon detection of a lost wireless connection for the at least one accessory device 102A, a separation notification may be sent and presented on the user interface 104, unless the connection is reestablished. In the simplest case, monitoring the wireless connection may entail testing to see if the wireless connection to the at least one accessory device exists (e.g., by attempting to send packets). Bookkeeping may be performed to update the status (e.g., near-owner, separated from owner, etc.) of devices near the mobile device 102B while in transit.

If no loss of wireless connection was detected, then the wireless connection monitoring 516 will cease upon detection of entry to the untrusted location 528. A geofence for the untrusted location 524 may be monitored to detect entry to the untrusted location 510. Bookkeeping is again performed 520, upon exit of the untrusted location 514 to update the status (e.g., near-owner, separated from owner, etc.) of any accessory device 102A.

Although the timeline 500 is presented as providing bookkeeping and separation notifications upon leaving a trusted location 504, those with skill in the art will recognize that the same provision of separation notifications in timeline 500 may be performed upon exit of untrusted, known locations. In some embodiments, the timeline 500 will repeat upon exit of untrusted location 514 and mobile device 102B will continue to monitor accessory devices 102A that were near mobile device 102B upon exit of trusted location 506. In yet another embodiment, additional accessory devices obtained upon exit of the untrusted location 514 may be optionally monitored for separation from mobile device 102B.

Figure 6:
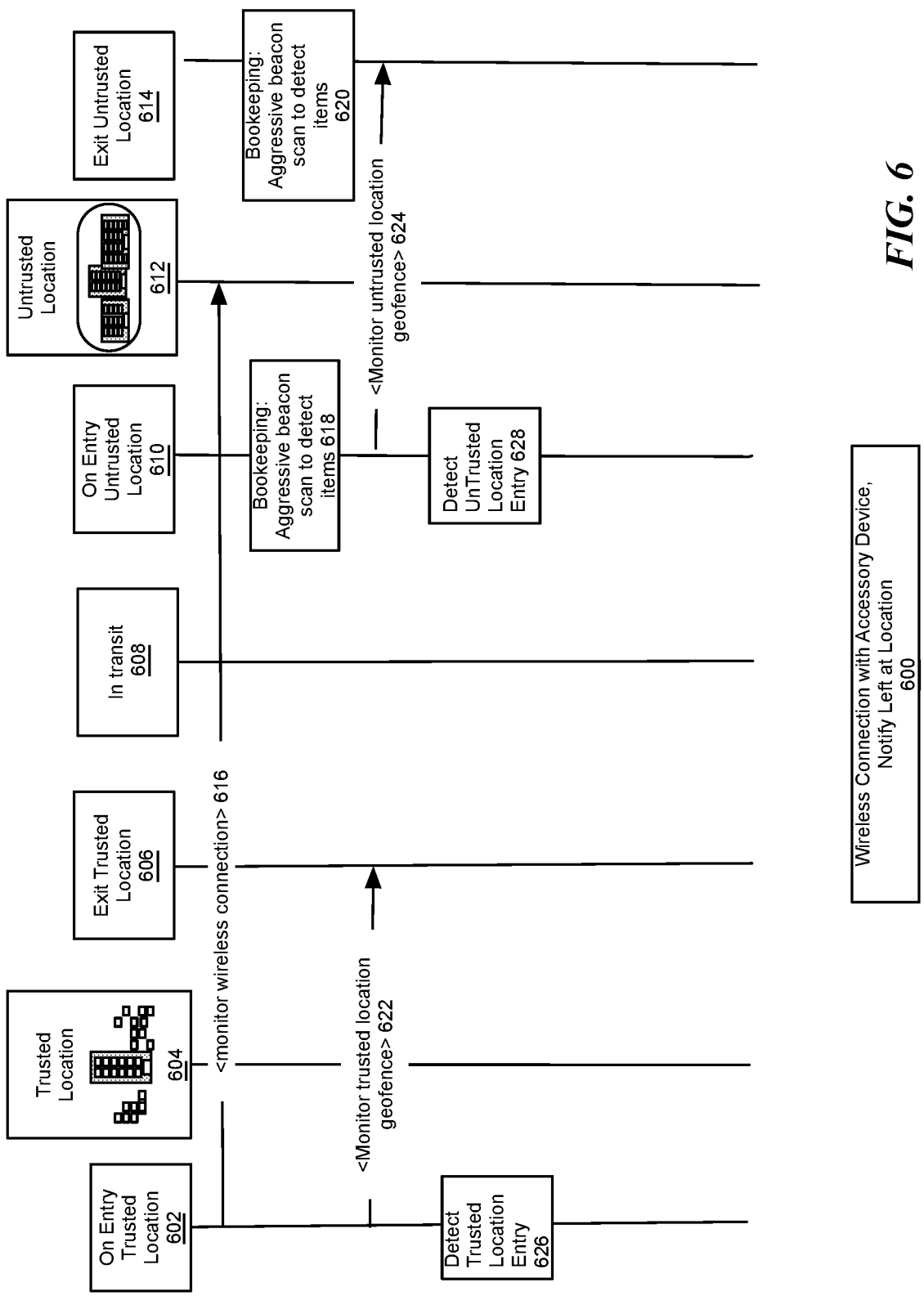
FIG. 6 is a timeline for provision of separation notifications for a mobile device that is in an untrusted, known location, according to an embodiment.

FIG. 6 is a timeline 600 for provision of separation notifications for a mobile device 102B that is in a "settled" state in an untrusted, known location 182, according to an embodiment. In an embodiment, mobile device 102B is paired and has a wireless connection, such as a Bluetooth connection, with accessory device 102A. As such, accessory device 102A may be described as being "leashed" to mobile device 102B. Separation notifications may be provided for the leashed accessory device 102A at the untrusted location 182, if the accessory device 102A exits the trusted location 606 with mobile device 102B, in an embodiment.

Entry to the trusted location 602 may be detected 626 when the mobile device 102B crosses a boundary for a geofence monitored for the trusted location 622, in an embodiment. As indicated above, trusted locations and untrusted locations information may be accessible on the mobile device 102B. When a determination is made from positioning information (e.g., GPS) for the mobile device 102B that the mobile device 102B has entered the trusted location, the geofence for the trusted location may be established and monitored. In some embodiments, one or more signals may be used to determine whether the mobile device 102B entered a location, is in a "settled" state at a location, exited the location, or is in a "in transit" state from/to a location. On entry to the trusted location 602, the wireless connection between accessory device 102A and mobile device 102B may be monitored 616. In the simplest case, monitoring the wireless connection may entail testing to see if the wireless connection to the at least one accessory device exists (e.g., by attempting to send packets). The wireless connection may continue to be monitored 616 while mobile device 102B leaves the trusted location 604 and is traveling (e.g., "in transit" state) to an untrusted location 612.

When movement is detected beyond a threshold distance from the trusted location 606, the mobile device 102B may be characterized as having exited the trusted location and is in the "in transit" state 608 by a classifier. Bookkeeping 618 may be performed to determine each of the accessory devices 102A that are near the mobile device 102B upon detection of entry of the untrusted location 628 and exit of the untrusted location 620 of the mobile device 102B with the user. Bookkeeping may involve recording a status of wireless connection between the mobile device 102B and each accessory device 102A determined to be with the mobile device 102B upon entry 610 and exit 614. A beacon scan may be performed at increased rate in addition to monitoring each wireless connection to determine each accessory device 102A that is with the mobile device 102B upon entry to the untrusted location 610 and upon exit 614 from the untrusted, known location 620. In particular, received beacon data from the aggressive beacon scan 618 and 620 may contain a packet from accessory device 102A with a status indicating whether at least one accessory device 102A is near the owner or separated from owner. The wireless connection with the accessory device 102A may be monitored 616, and upon detection of a lost wireless connection for the at least one accessory device 102A, a separation notification may be sent and presented on the user interface 104, unless the connection is reestablished. Bookkeeping may be performed to update the status of devices near the mobile device 102B.

A geofence for the untrusted location 624 may be monitored to detect entry to the untrusted location 610 and exit 614. Bookkeeping is again performed 620, upon exit of the untrusted location 614 to update the status of any accessory device 102A that was near mobile device 102B upon exit from the trusted location 604, such as accessory device 102A. The status may be updated to indicate if accessory device 102A has a wireless connection with mobile device 102B or has lost the connection. The status may also be updated to indicate if beacon data received provided information on status of the accessory device 102A, such as whether the accessory device 102A is near-owner or separated from owner. In some embodiments, the timeline 500 will repeat upon exit of untrusted location 614 and mobile device 102B will continue to monitor accessory devices 102A that were near mobile device 102B upon exit of trusted location 606.

Figure 7:
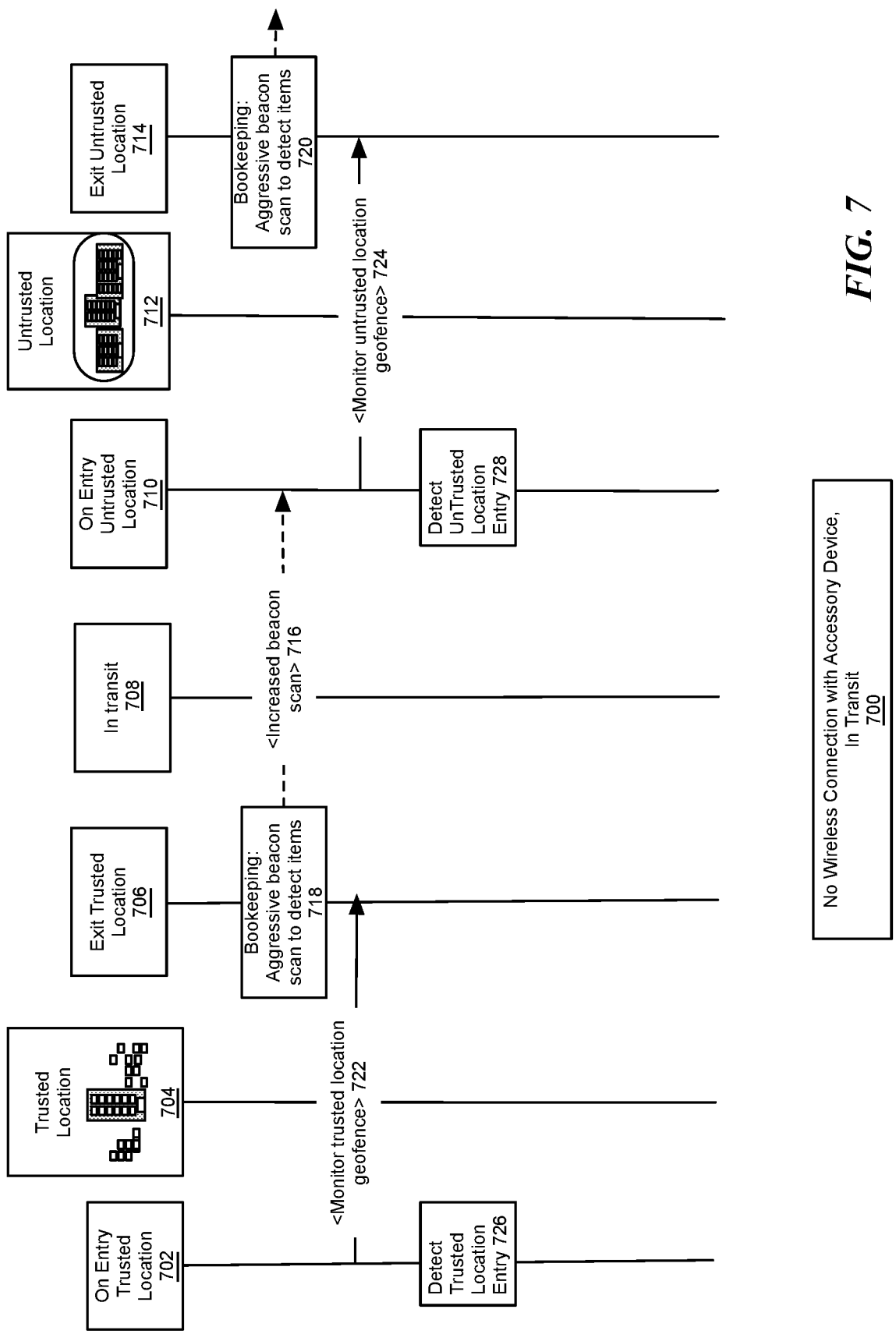
FIG. 7 is a timeline for provision of separation notifications while a mobile device is in transit, according to an embodiment.

FIG. 7 is a timeline 700 for provision of separation notifications while mobile device 102B is in transit, according to an embodiment. In some embodiments, accessory device 102A is paired with a device associated with a cloud-based user account, registered with locator services 170 to allow access to location information for the accessory device 102A, and stored public/private key pair in the synchronized keystore described in relation to FIG. 4. Mobile device 102B may have access to the public/private key pair associated with accessory device 102A by virtue of the cloud-based keystore for the cloud-based user account. In an embodiment, mobile device 102B has been paired with accessory device 102A and has access to the public/private key pair associated with accessory device 102A. In either case, a relationship or association is formed between mobile device 102B and accessory device 102A and mobile device 102B and accessory device 102A do not have a wireless connection, such as a Bluetooth connection, with accessory device 102A.

As indicated above, when mobile device 102B is paired with the accessory device 102A or has access to the cloud-based keystore, the mobile device 102B is associated with accessory device 102A and may have access to locator services 170 location information for accessory device 102A. Additionally, when mobile device 102B is paired to accessory device 102A and/or has access to the cloud-based keystore with the public/private keypair for accessory device 102A, mobile device 102B may be established as representing an ownership relationship with accessory device 102A and beacon signal status regarding ownership (e.g., near-owner and separated from owner) can be provided based off proximity to mobile device 102B with the relationship. Put another way, accessory device 102A has a near-owner status when it is near mobile device 102B and a separated from owner status when it is not proximate to mobile device 102B. As such, accessory device 102A may be described as a registered accessory with a relationship or association with mobile device 102B, but accessory device 102A is unleashed, disconnected, and/or "not leashed" to mobile device 102B. Separation notifications may be provided for the registered and unleashed accessory device 102A while in transit, if the accessory device 102A exits a trusted location 706 with mobile device 102B.

Entry to a trusted location 702 may be detected 726 when the mobile device 102B crosses a boundary for a geofence monitored for the trusted location 722, in an embodiment. As indicated above, trusted locations and untrusted locations information may be accessible on the mobile device 102B. When a determination is made from positioning information (e.g., GPS) for the mobile device 102B that the mobile device 102B has entered the trusted location, the geofence for the trusted location may be established and monitored. In some embodiments, one or more signals may be used to determine whether the mobile device 102B entered a location, is in a "settled" state at a location, exited a location, or is in a "in transit" state from/to a location.

When movement is detected beyond a threshold distance from the trusted location 706 after crossing the geofence border for the trusted location, the mobile device 102B may be characterized as having exited the trusted location and is in an "in transit" state 708 by a classifier. Bookkeeping 718 may be performed to determine each of the accessory devices 102A that are near the mobile device 102B upon exit of the trusted location 706 and traveling with the mobile device 102B while in the "in transit" state. Bookkeeping may involve recording a status of wireless connection between the mobile device 102B and each accessory device 102A determined to be with the mobile device 102B upon exit 706. Mobile device 102B may be limited in the number of wireless connections that the device can have established at any one time. Those with skill in the art will recognize that wireless connection status can change for each device as wireless connections are established, lost, and/or reestablished over time, and bookkeeping is performed to record the wireless connection status for each device. A beacon scan may be performed at increased rate to determine each device that is in transit with the mobile device 102B. In particular, received beacon data from the beacon scan 718 may contain a packet from accessory device 102A with a status (e.g., near-owner and separated from owner status) for at least one accessory device 102A.

Repeated beacon scans may be performed such that the accessory device 102A may be described as monitored 716 with repeated increased beacon scans, and upon detection of a lost accessory device 102A, a separation notification may be sent and presented on the user interface 104, unless the connection is reestablished. Bookkeeping may be performed to update the status of devices near the mobile device 102B while in transit.

If no loss of accessory device 102A was detected, then the wireless connection monitoring 716 will cease upon detection of entry 710 to the untrusted location 728. A geofence for the untrusted location 724 may be monitored to detect entry to the untrusted location 712. Bookkeeping is again performed 720, upon exit of the untrusted location 714 to update the status of any accessory device 102A.

Although the timeline 700 is presented as providing bookkeeping and separation notifications upon leaving a trusted location 704, those with skill in the art will recognize that the same provision of separation notifications in timeline 700 may be performed upon exit of untrusted, known locations. In some embodiments, the timeline 700 will repeat upon exit of untrusted location 714 and mobile device 102B will continue to monitor accessory devices 102A that were near mobile device 102B upon exit of trusted location 706. In yet another embodiment, additional accessory devices obtained upon exit of the untrusted location 714 may be optionally monitored for separation from mobile device 102B.

Figure 8:
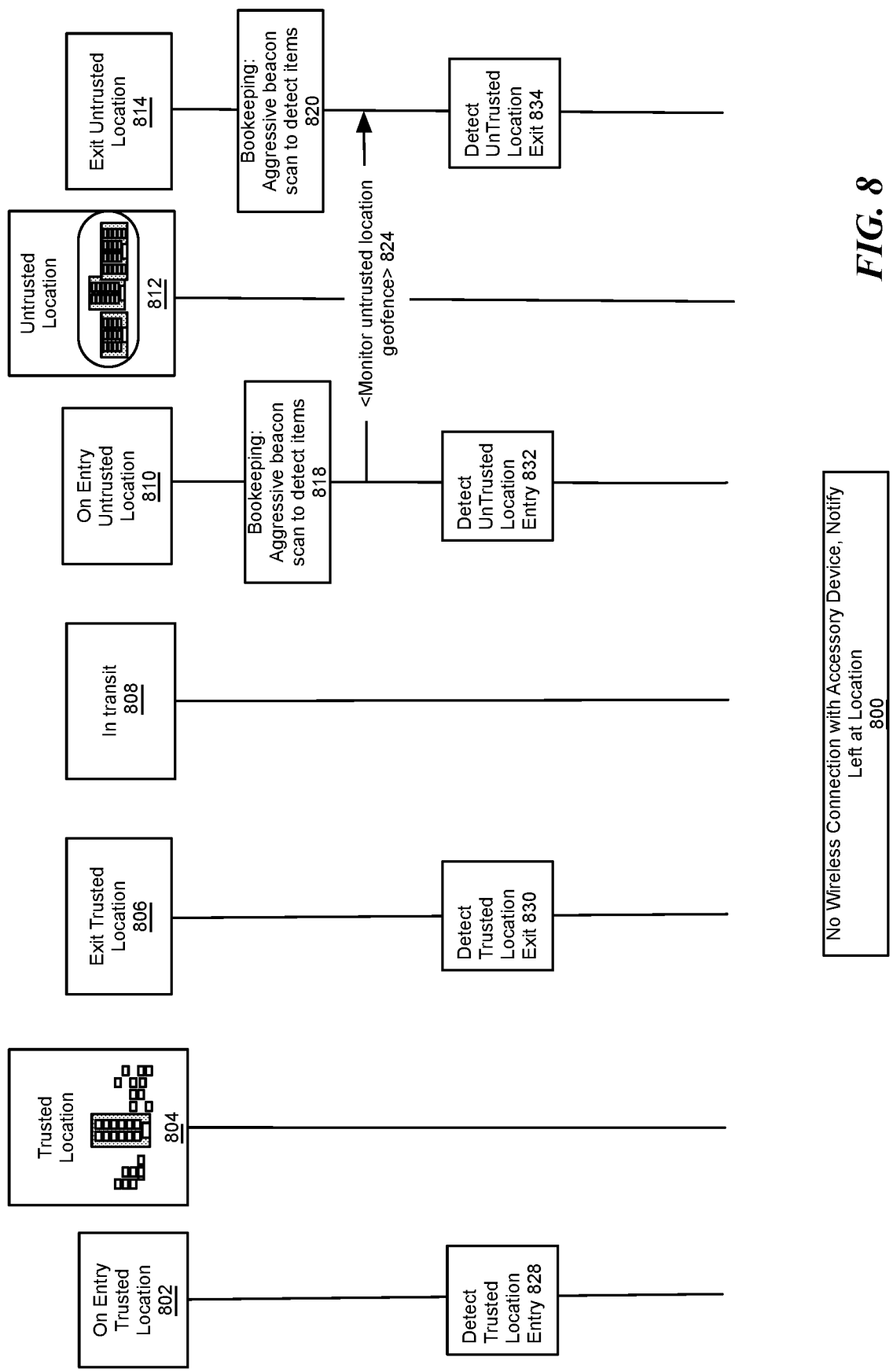
FIG. 8 is a timeline for provision of separation notifications for a mobile device that is in an untrusted, known location, according to an embodiment.

FIG. 8 is a timeline 800 for provision of separation notifications for a mobile device 102B that is in a "settled" state in an untrusted, known location 812, according to an embodiment. In some embodiments, accessory device 102A is paired with a device associated with a cloud-based user account, registered with locator services 170 to allow access to location information for the accessory device 102A, and stored public/private key pair in the synchronized keystore described in relation to FIG. 4. Mobile device 102B may have access to the public/private key pair associated with accessory device 102A by virtue of the cloud-based keystore for the cloud-based user account. In an embodiment, mobile device 102B has been paired with accessory device 102A and has access to the public/private key pair associated with accessory device 102A. In either case, a relationship or association is formed between mobile device 102B and accessory device 102A and mobile device 102B and accessory device 102A does not have a wireless connection, such as a Bluetooth connection, with accessory device 102A.

As indicated above, when mobile device 102B is paired with the accessory device 102A or has access to the cloud-based keystore, the mobile device 102B is associated with accessory device 102A and may have access to locator services 170 location information for accessory device 102A. Additionally, when mobile device 102B is paired to accessory device 102A and/or has access to the cloud-based keystore with the public/private keypair for accessory device 102A, mobile device 102B may be established as representing an ownership relationship with accessory device 102A and beacon signal status regarding ownership (e.g., near-owner and separated from owner) can be provided based off proximity to mobile device 102B with the relationship. Put another way, accessory device 102A has a near-owner status when it is near mobile device 102B and a separated from owner status when it is not proximate to mobile device 102B. As such, accessory device 102A may be described as a registered accessory with a relationship or association with mobile device 102B, but accessory device 102A is unleashed, disconnected, and/or "not leashed" to mobile device 102B. Separation notifications may be provided for the not leashed accessory device 102A at the untrusted location, if the accessory device 102A exits the trusted location 806 with mobile device 102B, in an embodiment.

Entry to the trusted location 802 may be detected 828 when the mobile device 102B crosses a boundary for a geofence monitored for the trusted location, in an embodiment. As indicated above, trusted locations and untrusted locations information may be accessible on the mobile device 102B. When a determination is made from positioning information for the mobile device 102B that the mobile device 102B has entered the trusted location, the geofence for the trusted location may be established and monitored. In some embodiments, one or more signals may be used to determine whether the mobile device 102B entered a location, is in a "settled" state at a location, exited the location, or is in a "in transit" state from/to a location. When movement is detected beyond a threshold distance from the trusted location 806 after crossing the geofence border for the trusted location, the mobile device 102B may be characterized as having exited the trusted location 830 and in the "in transit" state 808 by a classifier.

Bookkeeping 818 may be performed to determine each of the accessory devices 102A that are near the mobile device 102B upon detection of entry of the untrusted location 818 and exit of the untrusted location 820 of the mobile device 102B with the user. Bookkeeping may involve recording a status of wireless connection between the mobile device 102B and each device determined to be with the mobile device 102B upon entry 810 and exit 814. Mobile device 102B may be limited in the number of wireless connections that the device can have established at any one time. Those with skill in the art will recognize that wireless connection status can change for each device as wireless connections are established, lost, and/or reestablished over time, and bookkeeping is performed to record the wireless connection status for each device. A beacon scan 818 may be performed at increased rate in addition to monitoring each wireless connection to determine each accessory device that is with the mobile device 102B upon entry to the untrusted location 810 and upon exit 814 from the untrusted, known location 820. In particular, received beacon data from the beacon scan 818 and 820 may contain a packet from accessory device 102A with a status (e.g., near-owner and separated from owner status) indicating whether at least one accessory device 102A is near the owner or separated from owner. Repeated beacon scans may be performed such that the accessory device 102A may be described as monitored using one or more aggressive beacon scans, and upon detection of an indication of separation from owner status from beacon data for the at least one accessory device 102A, a separation notification may be sent and presented on the user interface 104, unless the connection is reestablished. Bookkeeping may be performed to update the status of devices near the mobile device 102B.

A geofence for the untrusted location 824 may be monitored to detect entry to the untrusted location 832 and exit 834. Bookkeeping is performed 820, upon exit of the untrusted location 814 to update the status of any accessory device 102A that was near mobile device 102B upon exit from the trusted location 804, such as accessory device 102A. The status may be updated to indicate if beacon data received provided information on status of the accessory device 102A, such as whether the accessory device 102A is near-owner or separated from owner. In some embodiments, the timeline 700 will repeat upon exit of untrusted location 814 and mobile device 102B will continue to monitor accessory devices 102A that were near mobile device 102B upon exit of trusted location 706.

Figure 9:
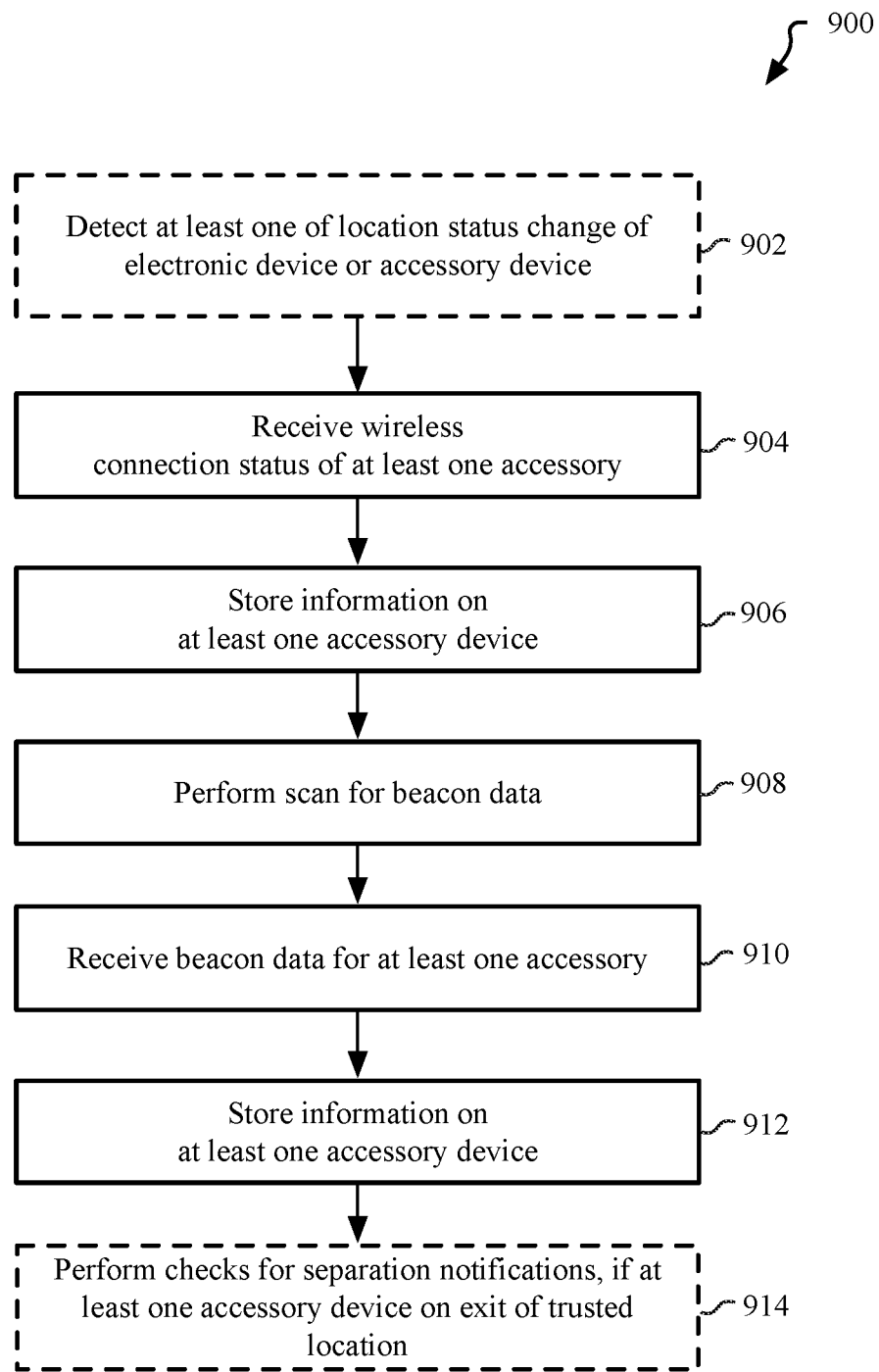
FIG. 9 is a flow diagram illustrating bookkeeping, which may be used in some embodiments of the invention.

FIG. 9 is a flow diagram 900 illustrating bookkeeping, which may be used in some embodiments of the invention. Optionally, bookkeeping may be performed when at least one location status change of mobile device 102B or accessory device 102A is detected (902). Those with skill in the art will recognize that bookkeeping for the status of whether a mobile device is near to one or more accessory devices may be done on-demand or with any mobile device 102B or accessory device 102A status change. One or more signals may be used to detect a location change, such as crossing a geofence boundary or positioning services. In some embodiments, mobile device 102B and accessory device 102A may be detected as proximate to the known location using information from a set of devices that may be used as signals for detecting a location change, such as an entry to a location using a paired door lock or an entry panel, a light switch, a home electronics device, any fixtures, transit card usage, other devices fixed to a location, or any other on-device data collected that may indicate the location of the mobile device 102B.

Next, status on a wireless connection with at least one accessory device 102A is received (904) and status information is stored (906). Any type of status information on the wireless connection may be stored for the mobile device 102B related to each accessory device 102A, such as a change in connection state, a loss of connection, an existence of connection, an RSSI measurement value, available wireless connections for the mobile device 102B at the time of check, and/or any other status information may be stored. For example, each accessory device 102A with a wireless connection may be given a status of being near-owner for the mobile device 102B, and each accessory device 102A that does not have a wireless connection may be given a status of separated from owner.

Next, a beacon scan is performed (908) to collect status information on accessory devices 102A paired or otherwise associated with the mobile device 102B. Beacon data may be received (910) by the mobile device 102B and may provide an indication as to whether an accessory device 102A is near-owner, separated from owner, or any other status provided with a beacon signal. Beacon data may provide additional status information including, but not limited to accessory device status, lost status, alarm status, and/or any other status. By way of example, if all of the wireless connection for the mobile device are in use, beacon data for the accessory device 102A may have a near-owner status and not be wirelessly connected because all available connections are in use for the mobile device 102B. Information on the at least one accessory device (912) status derived from the beacon data may be stored.

Optionally, a condition may be placed on whether the mobile device 102B provides separations notifications for particular accessory devices 102A. If at least one accessory device is near-owner or has a wireless connection to the mobile device 102B when the user leaves a trusted location (914), then the separation notifications may be provided for the accessory devices 102A. Those with skill in the art will recognize that separation notifications may be provided upon leaving trusted locations in addition to untrusted locations as well as accessory devices acquired during transit.

Figure 10:
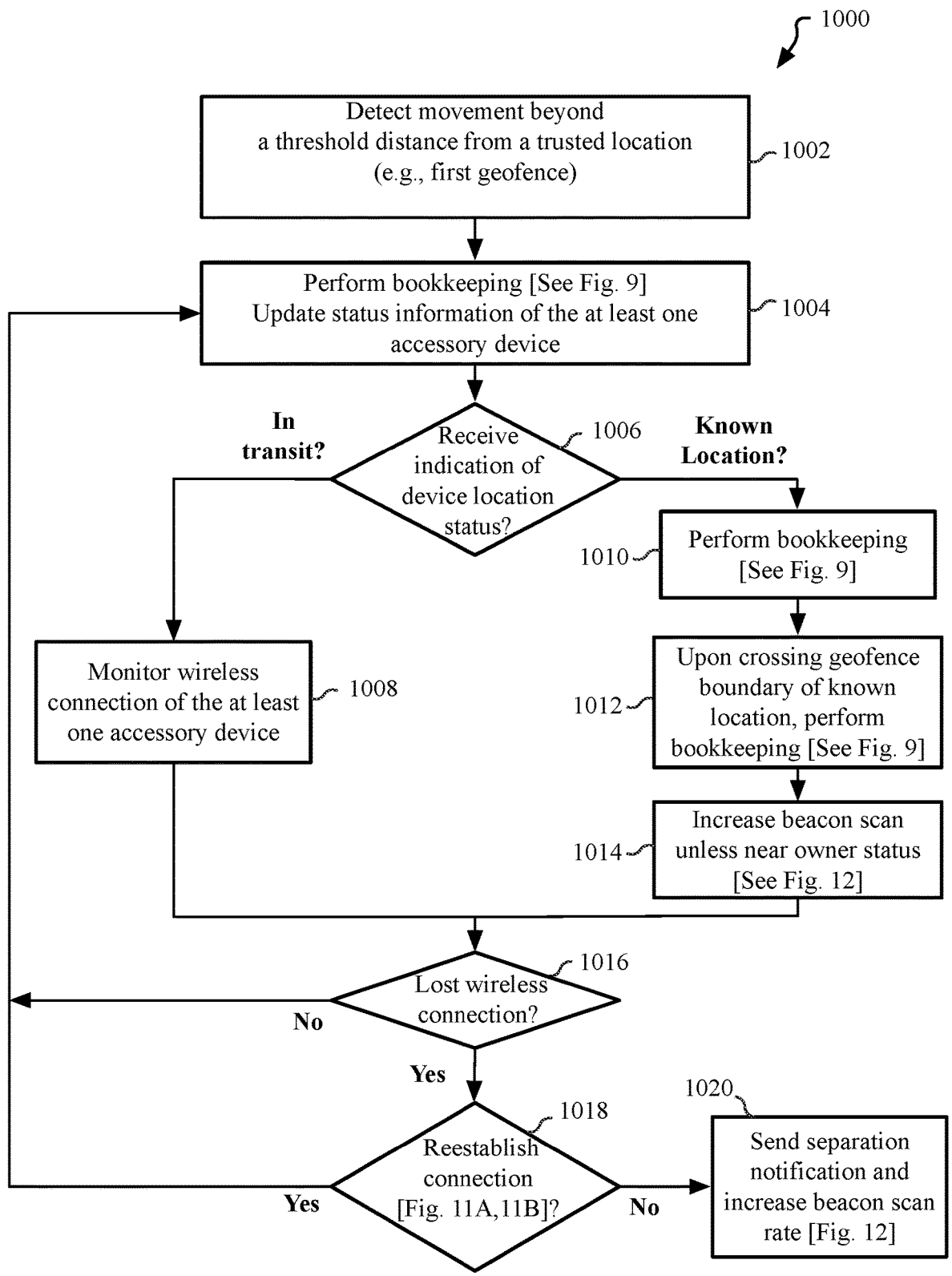
FIG. 10 is a flow diagram illustrating provision of separation notifications for leashed accessory devices, in an embodiment.

FIG. 10 is a flow diagram 1000 illustrating provision of separation notifications for leashed accessory devices, in an embodiment. Movement beyond a threshold distance from a trusted location is detected (1002). A first geofence may be established for the trusted location and detection of mobile device 102B beyond a boundary of the first geofence may indicate that the mobile device 102B has exited the trusted location. In some embodiments, multiple signals are used to determine if the mobile device 102B has moved beyond a threshold distance from a trusted location, such as location classified as a user's home. Bookkeeping, as described with FIG. 9, may be performed to determine the accessory devices 102A that are with the user's mobile device 102B and update the status information for accessory devices 102A associated with the mobile device 102B (1004).

Next, an indication may be received that the mobile device 102B location status has changed (1006). If the indication is that the mobile device 102B is in transit, then the wireless connection of the accessory device 102A is monitored (1008). In some embodiments, the classifier on the mobile device 102B may be used to indicate that the device is the in transit state. Upon detection of a lost wireless connection for the at least one accessory device (1016), a separation notification may be sent (1020), if the connection is not reestablished as described below with FIGS. 11A and 11B (1018). In some embodiments, a last known location geofence may be established at a last known location. Upon detection of crossing the geofence boundary of a last known location for a threshold period of time, a rate of a beacon scan may be increased as shown in FIG. 12. If the threshold period of time (e.g., thirty seconds) has been exceeded, then a separation notification may be presented on the mobile device 102B.

Alternatively, if the indication of device location is that the device is in a known location (1006), then bookkeeping is performed upon entry to the known location (1010). A geofence for the known location is monitored and bookkeeping (See FIG. 9) is performed again upon detection of the mobile device crossing the known location geofence boundary (1012). An aggressive beacon scan is performed as illustrated with FIG. 12 (1014). Separation notification is sent (1020), if the connection is not reestablished (1018). An aggressive beacon scan as shown with FIG. 12 is again performed to determine accessory device 102A status (1020).

Figure 11A:
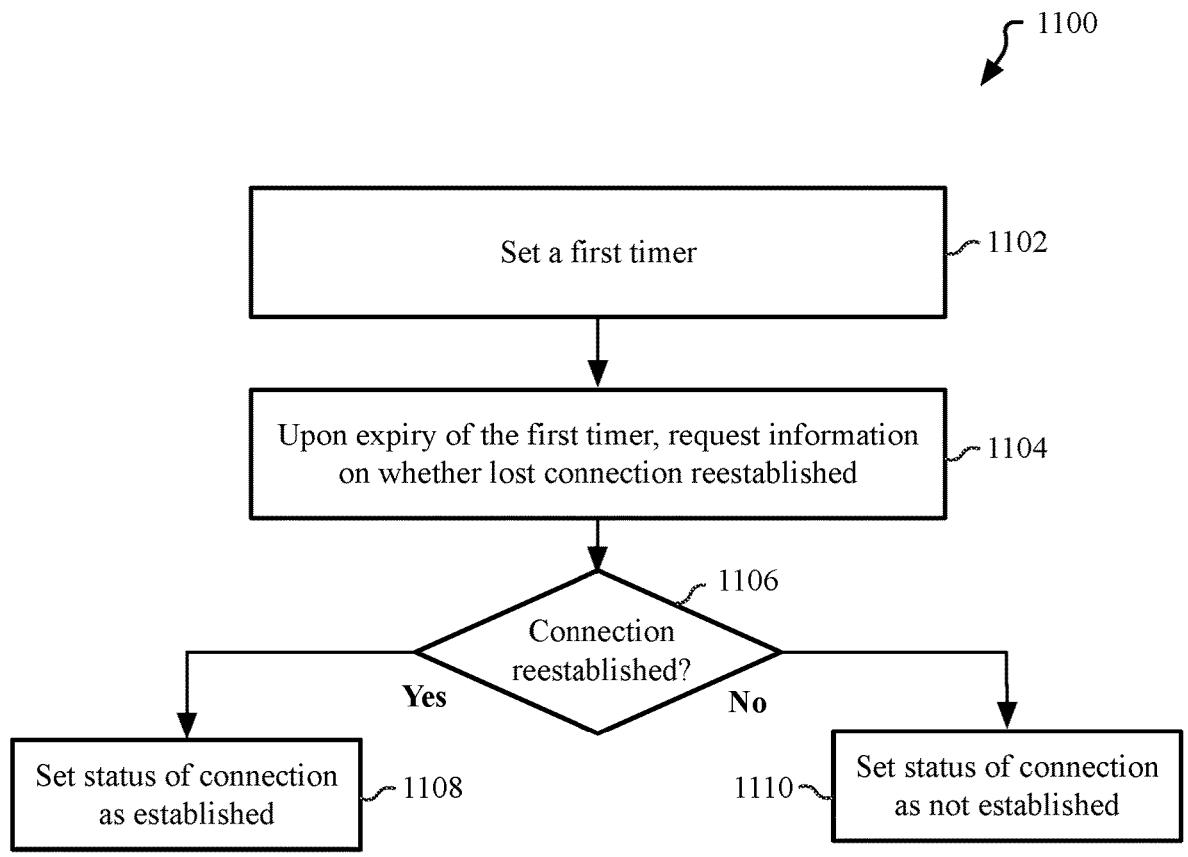
FIGS. 11A and 11B are flow diagrams illustrating provision of separation notifications, in an embodiment.
Figure 11B:
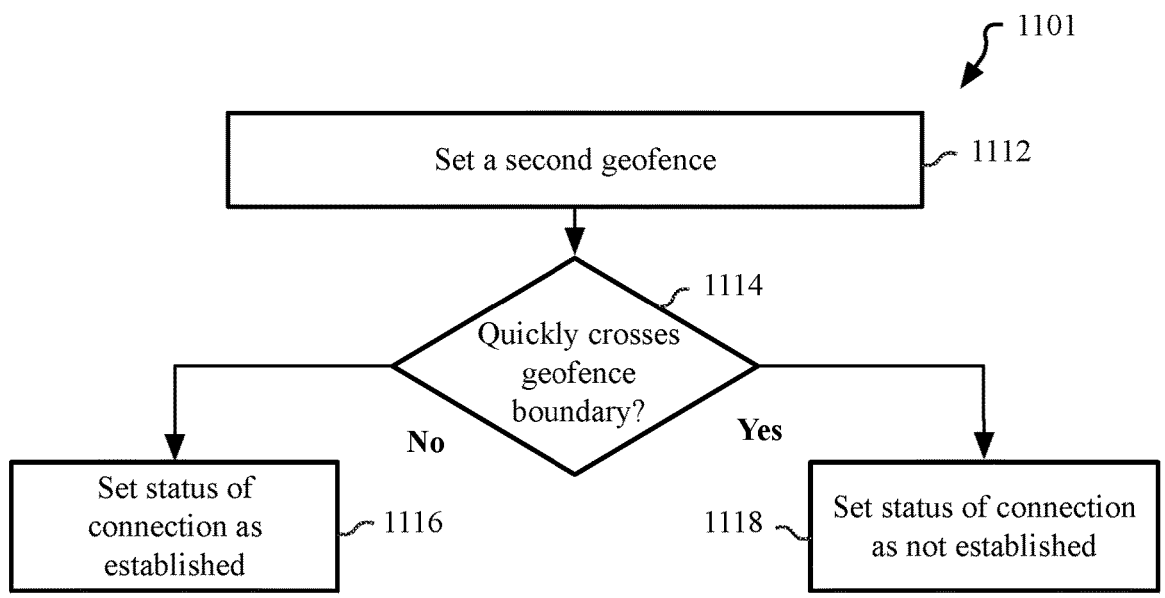
Figure 12:
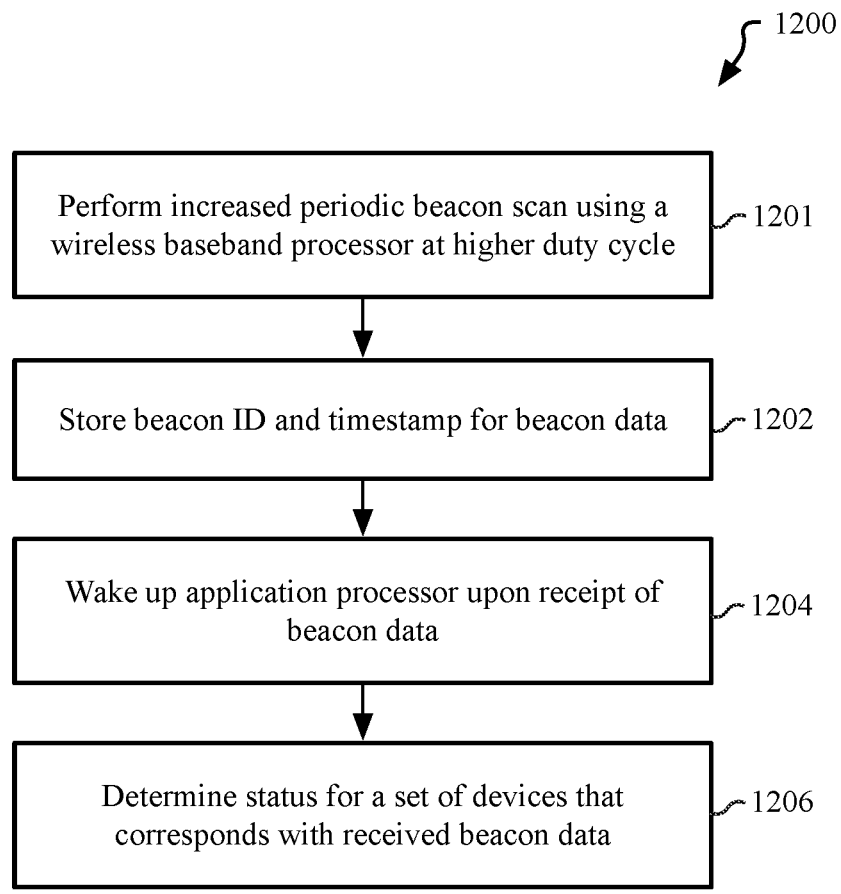
FIG. 12 is a flow diagram illustrating a beacon scan, in an embodiment.

FIGS. 11A and 11B are flow diagrams illustrating provision of separation notifications, in an embodiment. FIG. 11A is a flow diagram 1100 illustrates approaches for provision of separation notifications so as to reduce the latency in presenting a relevant separation notification. Upon detection of a lost wireless connection for the at least one accessory device 102A, a first timer for a first defined period of time (e.g., thirty seconds) may be set (1102). Upon expiry of the first timer, information is requested on whether the lost wireless connection is reestablished (1104). If the connection is reestablished (1106), then the status of the connection is set to established (1108). Alternatively, the status of the connection is set as not established (1110).

FIG. 11B is a flow diagram 1101 illustrates approaches for provision of separation notifications so as to reduce the latency in presenting a relevant separation notification. Upon detection of a lost wireless connection for the at least one accessory device 102A, a second geofence for a last known location is monitored (1112). The defined boundaries for the last known location 182 may be accessible by mobile device 102B. If the mobile device 102B does not move quickly across the second geofence boundary (1114), then the status of the connection is set to established (1116). Alternatively, the status of the connection is set as not established (1118).

FIG. 12 is a flow diagram 1200 illustrating an aggressive beacon scan, in an embodiment. A periodic beacon scan using a wireless baseband processor is performed at a higher duty cycle (1201), such as 100%. The increased beacon scans are performed both when the accessory device 102A accessible on or off WAN network. In some embodiments, the rate of the beacon scan is performed every N seconds for M minutes, such as six seconds for every three minutes. The rate is increased to be performed P times, such as three times, more than an expected rate of packets received from the accessory device 102A being sent every Q seconds, such as every two seconds. Put another way, the beacon scan increased rate of P may be a multiple of the Q seconds of expected receipt of beacon data from accessory device 102A. In between scans, the wireless baseband processor may be asleep. While the beacon scan can also be performed when the application processor is active, beacon scans can be performed by the wireless processor and a wireless radio receiver as a low power operation while the mobile device 102B is idle, inactive, or otherwise in a low power state. In some embodiments, the scan may be performed at a higher duty cycle, such as at 100%, to insure capture of the beacon data from nearby devices.

In some embodiments, the duration of the increased scan may be configured depending on the particular task, such as detecting accessory devices or monitoring locations of accessory devices 102A. For example, upon exit from a trusted location 706, the scan may be performed twice to immediately detect accessory devices 102A with the mobile device 102B, as shown in FIG. 7. Continuing with FIG. 7 example, the scan may be performed for a longer duration as shown with "Increased beacon scan" 716 when monitoring the status of the accessory device 102A. In some embodiments, positioning information, such as GPS, is obtained for the mobile device 102B to record a last known location for a particular status (e.g., near-owner, separated from owner) of an accessory device 102A.

The beacon id and timestamp for the beacon data is stored (1202) and the application processor is woken up to process the beacon data (1204). The beacon id in one embodiment, is a public key that is generated by the wireless device based on a timestamp and a shared secret generated with the mobile device of the owner. Status of a set of accessory devices (e.g., accessory device 102A) may be determined as "near-owner" or "separated from owner" based on the received beacon data that corresponds to each accessory device (1206).

Figure 13:
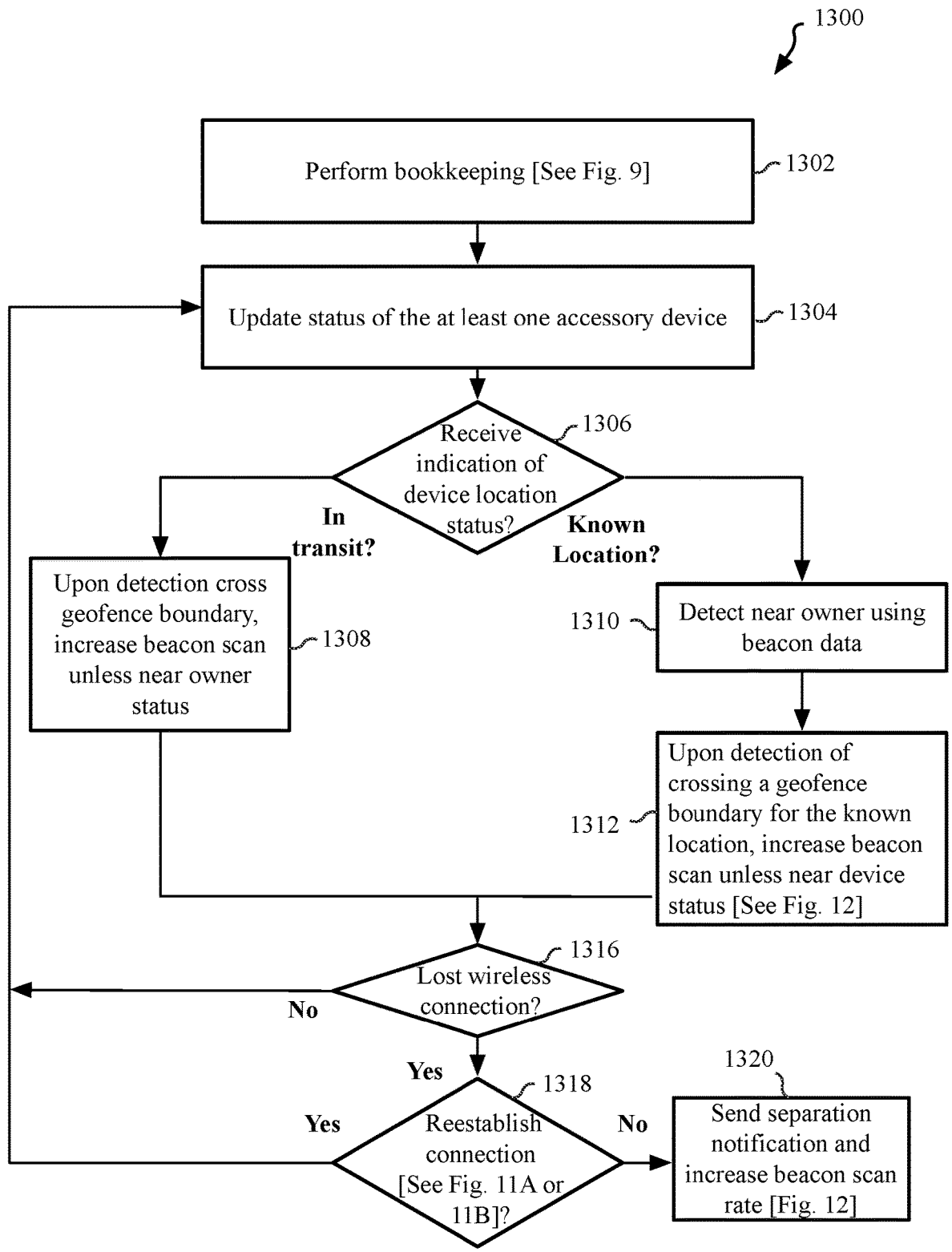
FIG. 13 is a flow diagram illustrating provision of separation notifications for non-leashed accessory devices, in an embodiment.

FIG. 13 is a flow diagram 1300 illustrating provision of separation notifications for non-leashed accessory devices, in an embodiment. In an embodiment, movement beyond a threshold distance from a trusted location 184 is detected. A first geofence may be established for the trusted location and detection of mobile device 102B beyond a boundary of the first geofence may indicate that the mobile device 102B has exited the trusted location. In some embodiments, multiple signals are used to determine if the mobile device 102B has moved beyond a threshold distance from a trusted location, such as location classified as a user's home.

Bookkeeping, as described with FIG. 9, may be performed (1302) to determine the accessory devices 102A that are with the user and update the status information for accessory devices 102A associated with the mobile device 102B (1304).

Next, an indication may be received that the mobile device 102B location status has changed (1306). If the indication is that the mobile device 102B is in transit, then the beacon scan may be increased (1308). The beacon scanning may be increased upon detection of crossing the geofence boundary for the trusted location. In some embodiments, the classifier on the mobile device 102B may be used to indicate that the device is in transit. Upon detection of a lost wireless connection for the at least one accessory device (1316), a separation notification may be sent (1320), if the connection is not reestablished as described below with FIGS. 11A and 11B (1318). In some embodiments, a last known location geofence may be established at a last known location. Upon detection of crossing the geofence boundary of a last known location for a threshold period of time, a rate of a beacon scan may be increased as shown in FIG. 12. If the threshold period of time has been exceeded, then a separation notification may be presented on the mobile device 102B.

Alternatively, if the indication of device location is that the device is in a known location (1306), then bookkeeping is performed upon entry to the known location (1310). A geofence for the known location is monitored and bookkeeping is performed, upon detection of the mobile device 102B crossing the known location geofence boundary (1312). An aggressive beacon scan is performed as illustrated with FIG. 12. Separation notification is sent (1320), if the connection is not reestablished (1318). An aggressive beacon scan is again performed (1320).

Figure 14:
FIG. 14-18 illustrate a device locator UI, according to an embodiment.
Figure 15:
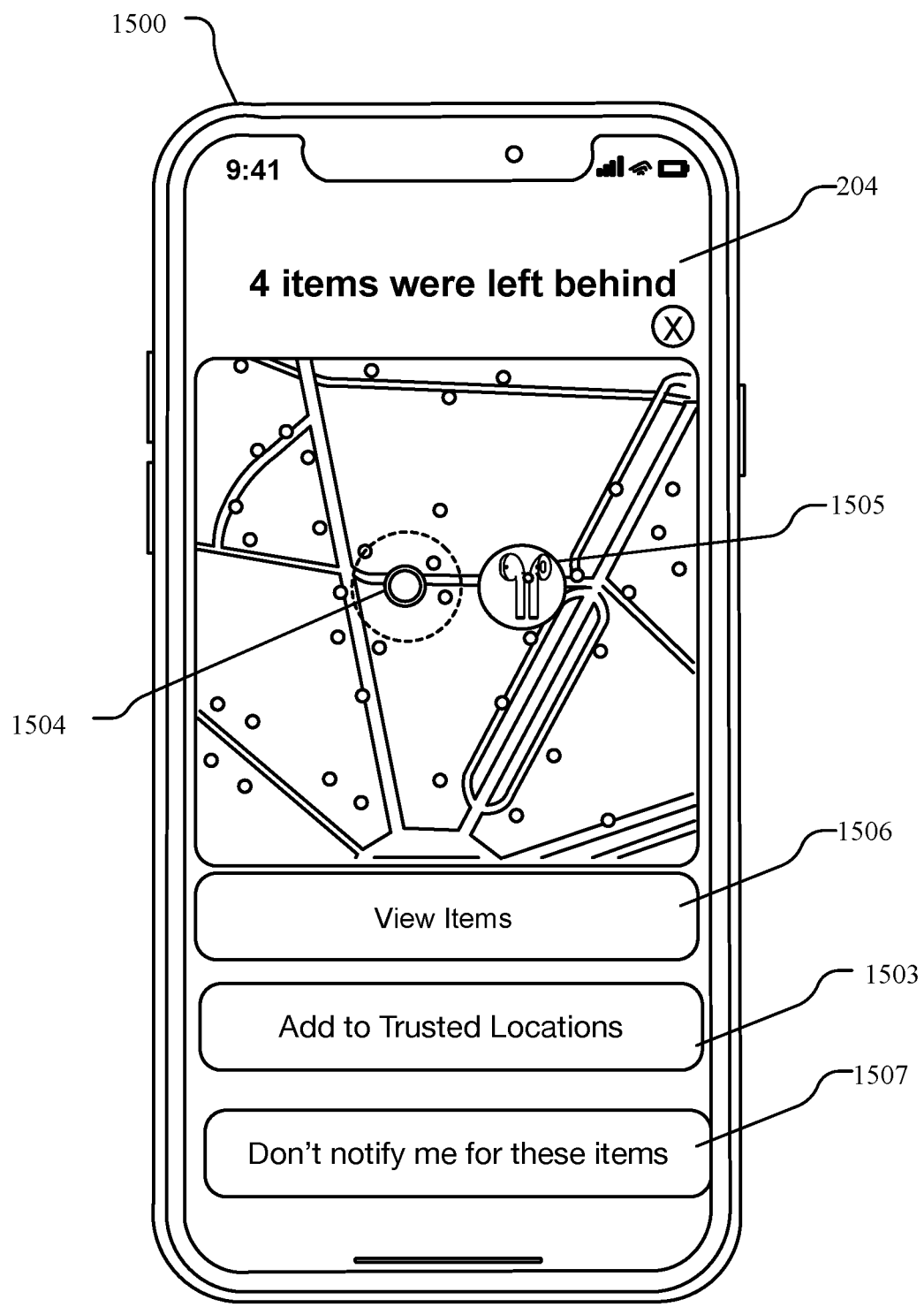
Figure 16:
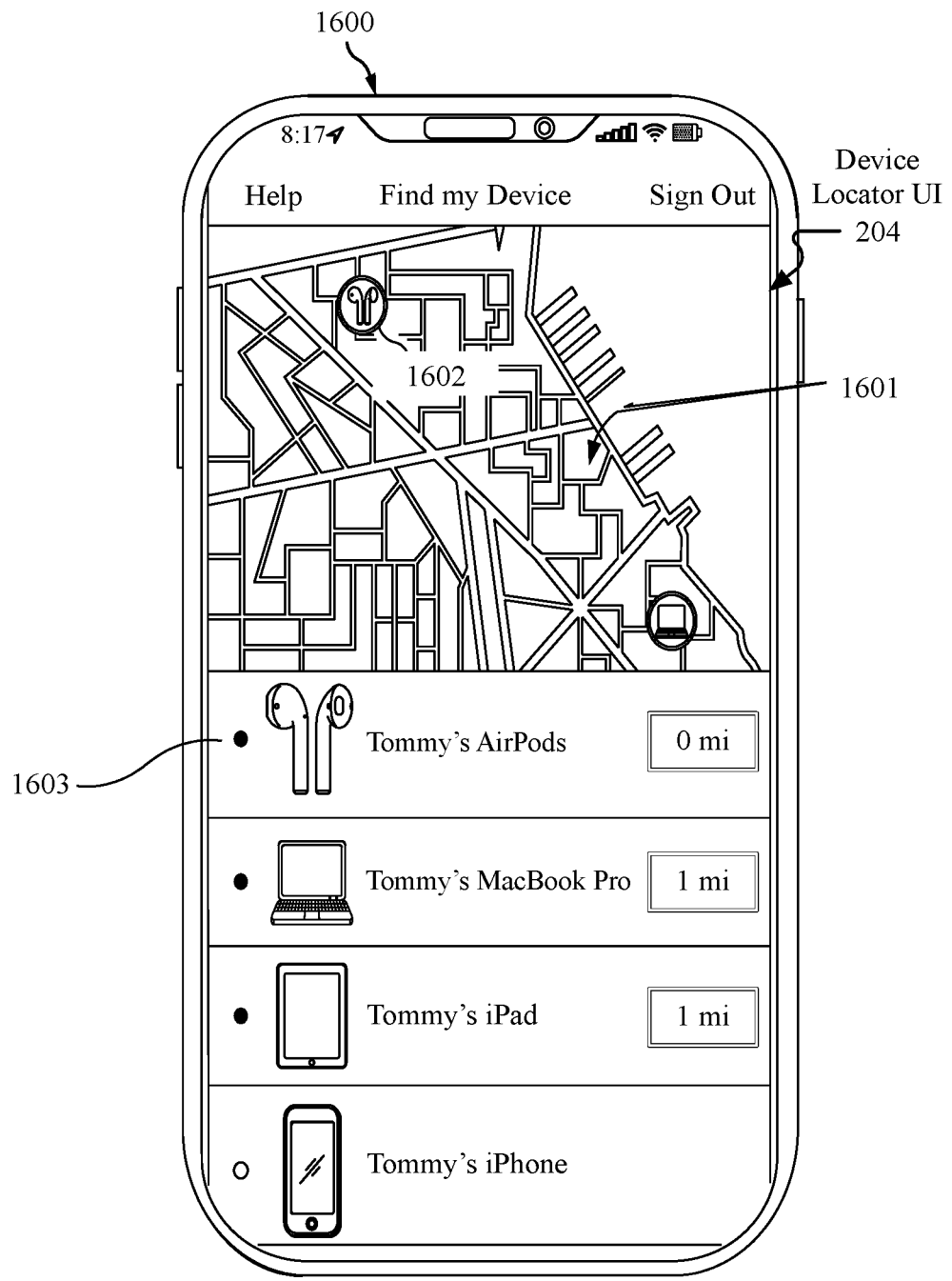
Figure 17:
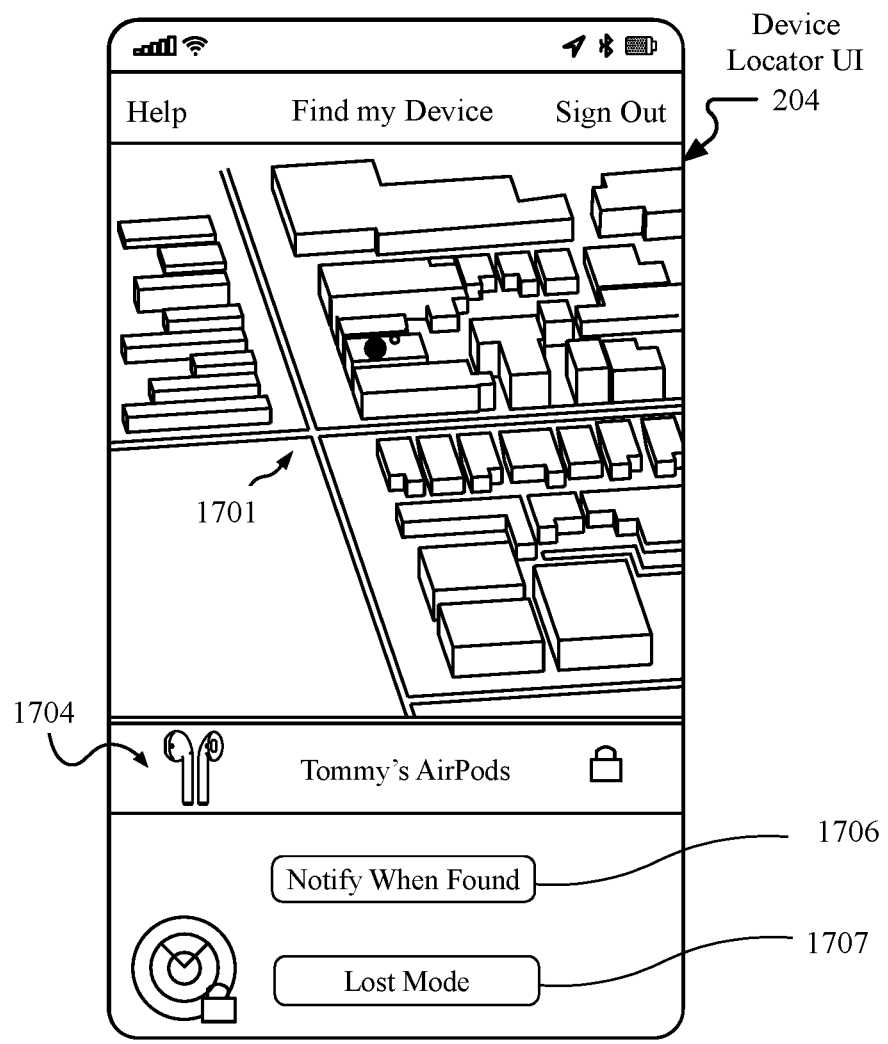

FIG. 14-18 illustrate a device locator UI 204, according to an embodiment. FIG. 14 shows a first graphical user interface of the device locator UI 204, according to an embodiment, which shows a notification for various wireless accessories of a user. FIG. 15 shows a second graphical user interface of the device locator UI 204, according to an embodiment, which enables a wireless accessory left behind to be viewed on a map, add trusted location, or request cease notifications for items. FIG. 16 shows a third graphical user interface of the device locator UI 204, according to an embodiment, which enables a wireless accessory to found on a map. FIG. 17 shows a third graphical user interface of the device locator UI 204, according to an embodiment, which enables a wireless accessory to be set to a lost mode or notify when found.

As shown in FIG. 14, the device locator UI 204 can be displayed on an electronic device 1400, which can be a mobile device 102B, or any other type of electronic device described herein. The device locator UI 204 can cause the presentation of separation notifications 1402 on the home screen 1401 of the electronic device 1400.

As shown in FIG. 15, the device locator UI 204 can present a unified graphical interface on electronic device 1500 through which multiple different types of devices and accessories can be located, including wireless devices with network or cellular access and wireless accessories without native network access. The device locator UI 204 can include a map 1504 with a marker 1505 that shows the current or last known location of a wireless device or accessory. The marker 1505 can be an icon, image, graphic or any other user interface element that identifies the accessory and conveys a location for the accessory. A selectable element 1506 in the device locator UI 204 can present a description or name of the wireless device or accessory and can show an estimated distance between the wireless device or accessory and the current location of the electronic device 1500 as shown in FIG. 16. A selectable element 1503 in the device locator UI 204 can present an interface to allow users to select to add trusted locations and selectable element 1507 can present a user interface to allow users to select not to be notified about the locations of particular items.

As shown in FIG. 16, the device locator UI 204 can present a second user interface that enables a wireless accessory view the item 1603 and distance from electronic device 1600. The second user interface can be displayed, in one embodiment, in response to the selection of the selectable element 1506 shown in FIG. 15. The second user interface can present a user interface element 1602 that represents and/or describes the wireless accessory in question, as well as the map 1601 and marker 1602 that show the current or last known location of the wireless accessory.

As shown in FIG. 17, the device locator UI 204 can present a third graphical user interface that enables a wireless accessory to be set to a lost mode. In one embodiment, when a wireless accessory cannot be located via the device locator UI 204, the map 1701 will not display a marker that indicates a location for the accessory. The device locator UI 204 can present the user interface element 1704 that represents and/or describes the wireless accessory in question and a set of selectable user interface elements. One selectable user interface element 1706 can present the option to notify the user when the accessory is found. When notify when found is enabled, in one embodiment the wireless accessory can be placed into a light lost mode. The electronic device associated with the device locator UI 1704 can generate a set of public keys that the wireless accessory will broadcast with the beacon signal during a future time period (e.g., next 24 hours, next 48 hours, etc.). If a signal is detected by a finder device using one of the future keys, the device locator server can notify one or more electronic devices associated with the user.

Another selectable user interface element 1707 can place the wireless accessory into an explicit lost mode. When explicitly placed into lost mode, the wireless accessory will be unable to be paired with other devices until the accessory is unlocked by the user or owner that places the device into lost mode. When sending a request to place a wireless accessory into lost mode, the requesting user can be required to enter authenticating information to ensure that the requesting user is authorized to request that lost mode be initiated on the lost accessory. The authenticating information can include a username or password associated with an account of a user, such as a cloud services account to which the user, electronic device, and wireless accessory are associated. The authenticating information can also include biometric information, such as a fingerprint or facial recognition data.

In one embodiment, a message and contact information provided by the requesting user can be displayed on the user device to alert a person who finds the lost wireless accessory on how to contact the requesting user. In one embodiment, the message and contact information can be displayed when another user attempts to pair another electronic device with the lost accessory.

Figure 18:
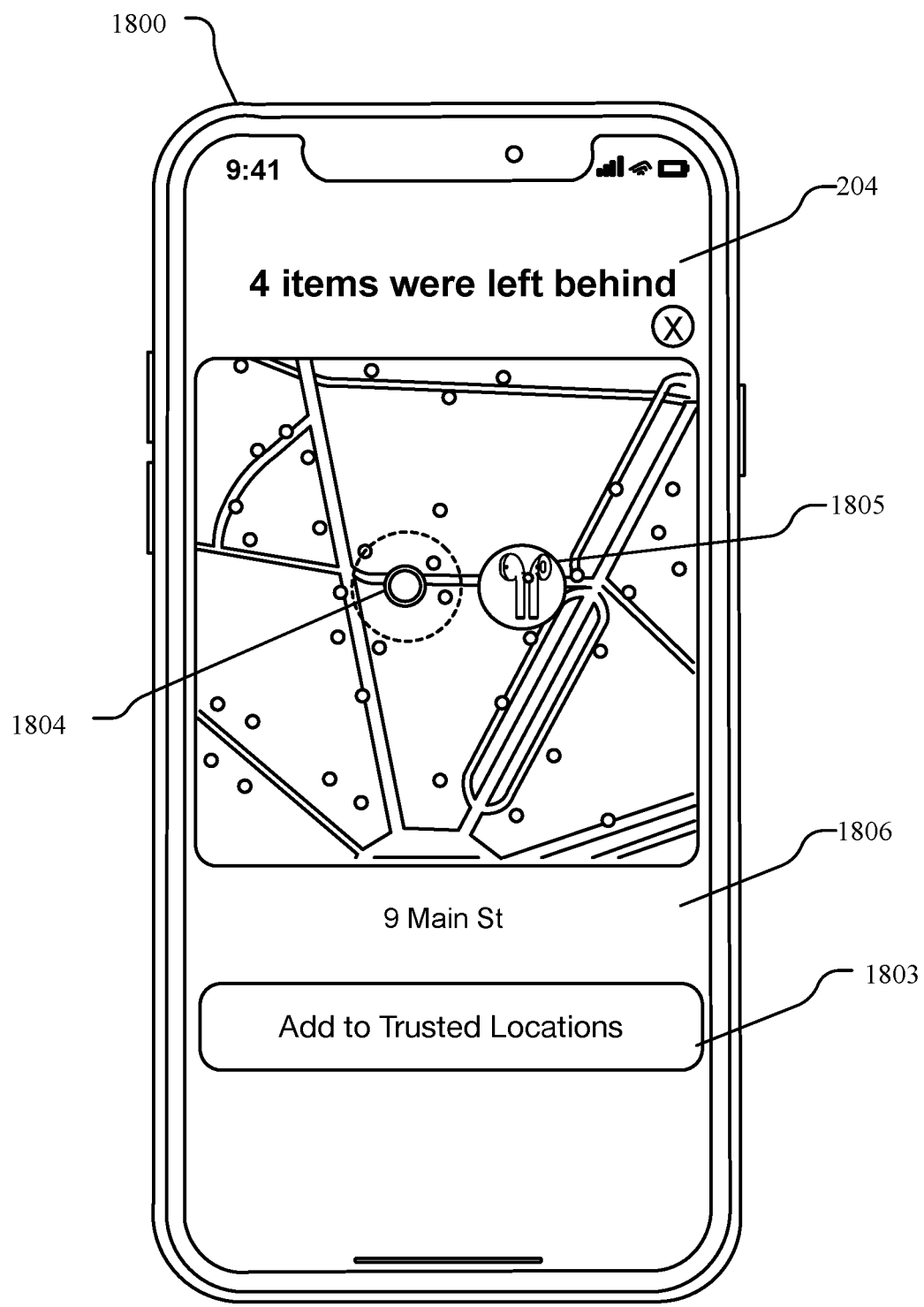

As shown in FIG. 18, the device locator UI 204 can present a fourth graphical user interface in electronic device 1800 that enables a designation of a known location 1806 shown on map with 1804 to become a trusted location with selection of selectable element 1803. The device locator UI 204 can present the user interface element 1805 that represents and/or describes the wireless accessory in question.

Figure 19:
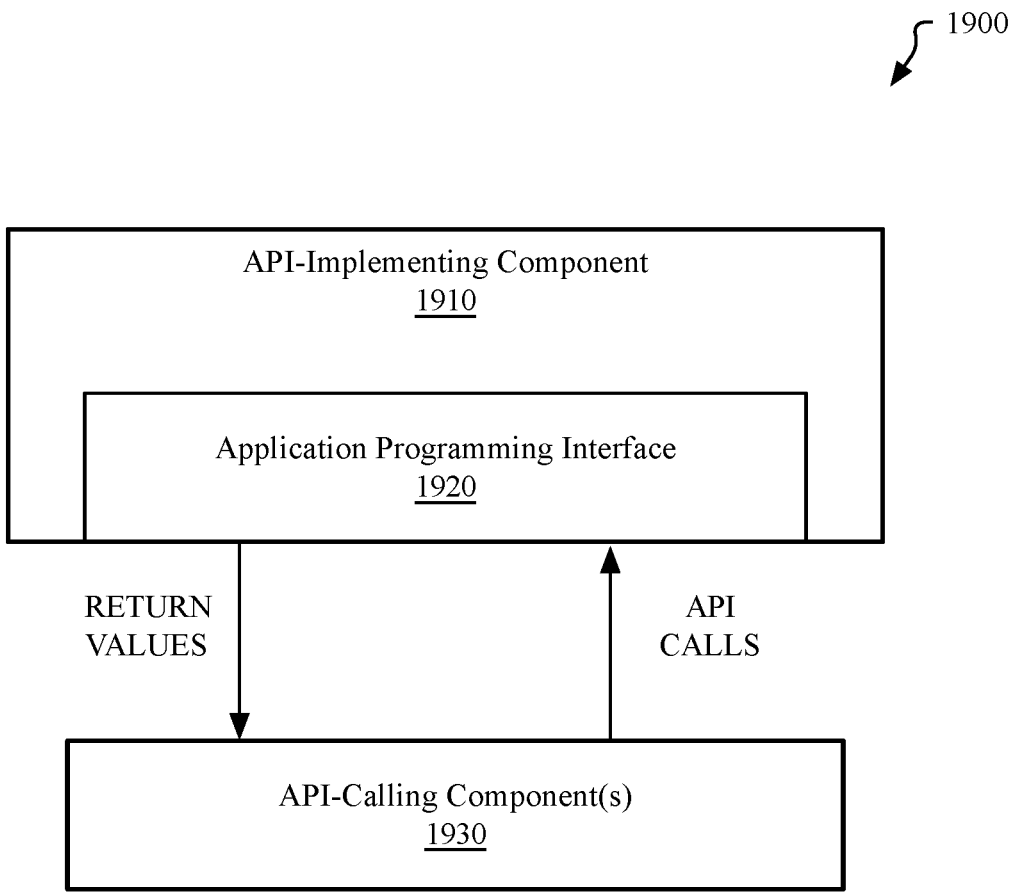
FIG. 19 is a block diagram illustrating an exemplary API architecture, which may be used in some embodiments of the invention.

FIG. 19 is a block diagram illustrating an exemplary API architecture, which may be used in some embodiments of the invention. As shown in FIG. 19, the API architecture 1900 includes the API-implementing component 110 (e.g., an operating system, a library, a device driver, an API, an application program, software or other module) that implements the API 1920. The API 1920 specifies one or more functions, methods, classes, objects, protocols, data structures, formats and/or other features of the API-implementing component that may be used by the API-calling component 1930. The API 1920 can specify at least one calling convention that specifies how a function in the API-implementing component receives parameters from the API-calling component and how the function returns a result to the API-calling component. The API-calling component 1930 (e.g., an operating system, a library, a device driver, an API, an application program, software or other module), makes API calls through the API 1920 to access and use the features of the API-implementing component 1910 that are specified by the API 1920. The API-implementing component 1910 may return a value through the API 1920 to the API-calling component 1930 in response to an API call.

It will be appreciated that the API-implementing component 1910 may include additional functions, methods, classes, data structures, and/or other features that are not specified through the API 1920 and are not available to the API-calling component 1930. It should be understood that the API-calling component 1930 may be on the same system as the API-implementing component 1910 or may be located remotely and accesses the API-implementing component 1910 using the API 1920 over a network. While FIG. 19 illustrates a single API-calling component 1930 interacting with the API 1920, it should be understood that other API-calling components, which may be written in different languages (or the same language) than the API-calling component 1930, may use the API 1920.

The API-implementing component 1910, the API 1920, and the API-calling component 1930 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 20:
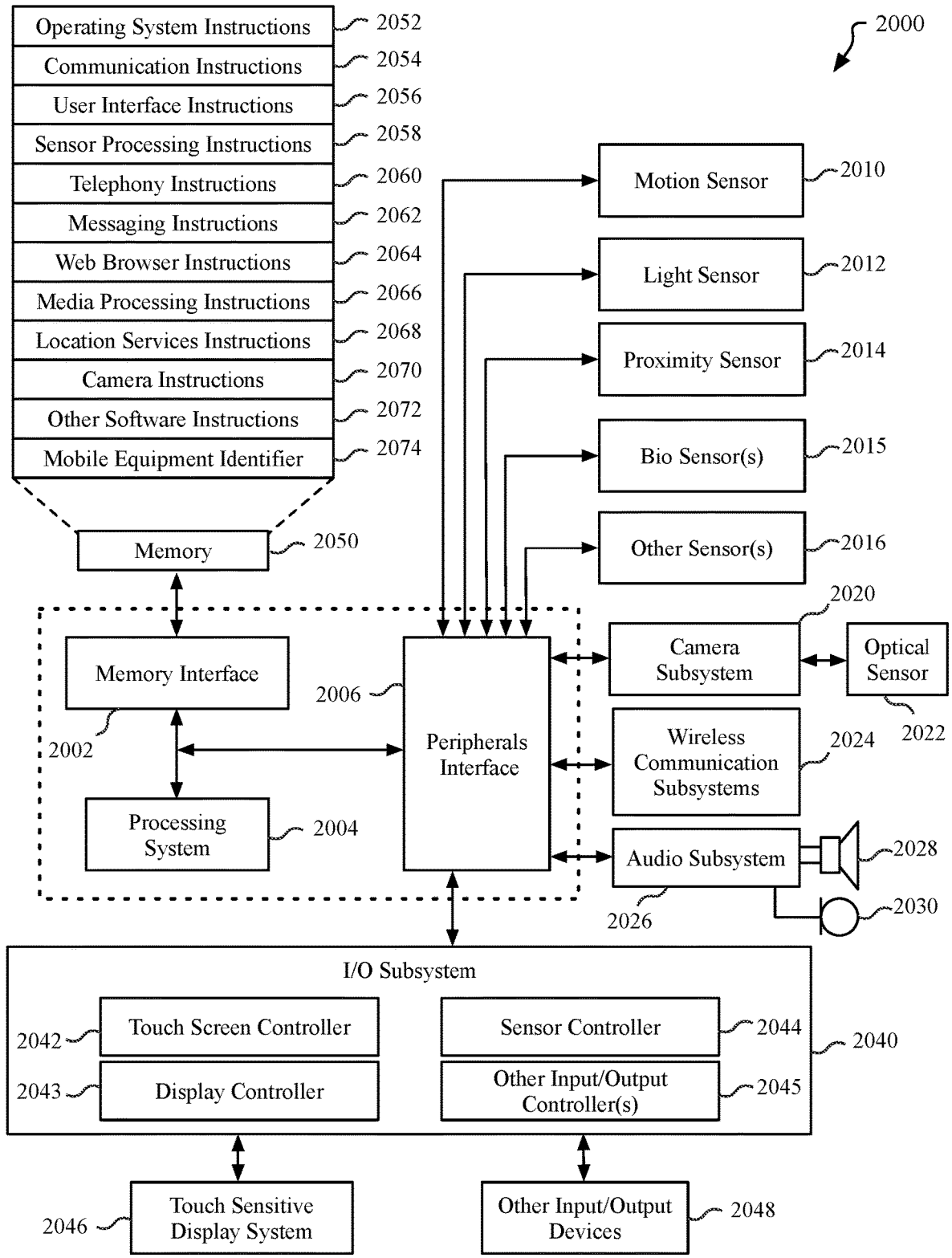
FIG. 20 is a block diagram of a device architecture for a mobile or embedded device, according to an embodiment.

FIG. 20 is a block diagram of a device architecture 2000 for a mobile or embedded device, according to an embodiment. The device architecture 2000 includes a memory interface 2002, a processing system 2004 including one or more data processors, image processors and/or graphics processing units, and a peripherals interface 2006. The various components can be coupled by one or more communication buses or signal lines. The various components can be separate logical components or devices or can be integrated in one or more integrated circuits, such as in a system on a chip integrated circuit.

The memory interface 2002 can be coupled to memory 2050, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 2006 to facilitate multiple functionalities. For example, a motion sensor 2010, a light sensor 2012, and a proximity sensor 2014 can be coupled to the peripherals interface 2006 to facilitate the mobile device functionality. One or more biometric sensor(s) 2015 may also be present, such as a fingerprint scanner for fingerprint recognition or an image sensor for facial recognition. Other sensors 2016 can also be connected to the peripherals interface 2006, such as a positioning system (e.g., GPS receiver), a temperature sensor, or other sensing device, to facilitate related functionalities. A camera subsystem 2020 and an optical sensor 2022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2024, which can include radio frequency receivers and transmitters and/or optical (e.g., infrared) receivers and transmitters. The specific design and implementation of the wireless communication subsystems 2024 can depend on the communication network(s) over which a mobile device is intended to operate. For example, a mobile device including the illustrated device architecture 2000 can include wireless communication subsystems 2024 designed to operate over a GSM network, a CDMA network, an LTE network, a Wi-Fi network, a Bluetooth network, or any other wireless network. In particular, the wireless communication subsystems 2024 can provide a communications mechanism over which a media playback application can retrieve resources from a remote media server or scheduled events from a remote calendar or event server.

An audio subsystem 2026 can be coupled to a speaker 2028 and a microphone 2030 to facilitate voice-enabled functions, such as voice recognition, voice replication, digital recording, and telephony functions. In smart media devices described herein, the audio subsystem 2026 can be a high-quality audio system including support for virtual surround sound.

The I/O subsystem 2040 can include a touch screen controller 2042 and/or other input controller(s) 2045. For computing devices including a display device, the touch screen controller 2042 can be coupled to a touch sensitive display system 2046 (e.g., touch-screen). The touch sensitive display system 2046 and touch screen controller 2042 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 2046. Display output for the touch sensitive display system 2046 can be generated by a display controller 2043. In one embodiment, the display controller 2043 can provide frame data to the touch sensitive display system 2046 at a variable frame rate.

In one embodiment, a sensor controller 2044 is included to monitor, control, and/or processes data received from one or more of the motion sensor 2010, light sensor 2012, proximity sensor 2014, or other sensors 2016. The sensor controller 2044 can include logic to interpret sensor data to determine the occurrence of one of more motion events or activities by analysis of the sensor data from the sensors.

In one embodiment, the I/O subsystem 2040 includes other input controller(s) 2045 that can be coupled to other input/control devices 2048, such as one or more buttons, rocker switches, thumb-wheel, infrared port, USB port, and/or a pointer device such as a stylus, or control devices such as an up/down button for volume control of the speaker 2028 and/or the microphone 2030.

In one embodiment, the memory 2050 coupled to the memory interface 2002 can store instructions for an operating system 2052, including portable operating system interface (POSIX) compliant and non-compliant operating system or an embedded operating system. The operating system 2052 may include instructions for handling basic system services and for performing hardware dependent tasks. In some implementations, the operating system 2052 can be a kernel.

The memory 2050 can also store communication instructions 2054 to facilitate communicating with one or more additional devices, one or more computers and/or one or more servers, for example, to retrieve web resources from remote web servers. The memory 2050 can also include user interface instructions 2056, including graphical user interface instructions to facilitate graphic user interface processing.

Additionally, the memory 2050 can store sensor processing instructions 2058 to facilitate sensor-related processing and functions; telephony instructions 2060 to facilitate telephone-related processes and functions; messaging instructions 2062 to facilitate electronic-messaging related processes and functions; web browser instructions 2064 to facilitate web browsing-related processes and functions; media processing instructions 2066 to facilitate media processing-related processes and functions; location services instructions including GPS and/or navigation instructions 2068 and Wi-Fi based location instructions to facilitate location based functionality; camera instructions 2070 to facilitate camera-related processes and functions; and/or other software instructions 2072 to facilitate other processes and functions, e.g., security processes and functions, and processes and functions related to the systems. The memory 2050 may also store other software instructions such as web video instructions to facilitate web video-related processes and functions; and/or web shopping instructions to facilitate web shopping-related processes and functions. In some implementations, the media processing instructions 2066 are divided into audio processing instructions and video processing instructions to facilitate audio processing-related processes and functions and video processing-related processes and functions, respectively. A mobile equipment identifier, such as an International Mobile Equipment Identity (IMEI) 2074 or a similar hardware identifier can also be stored in memory 2050.

Each of the above identified instructions and applications can correspond to a set of instructions for performing one or more functions described above. These instructions need not be implemented as separate software programs, procedures, or modules. The memory 2050 can include additional instructions or fewer instructions. Furthermore, various functions may be implemented in hardware and/or in software, including in one or more signal processing and/or application specific integrated circuits.

Figure 21:
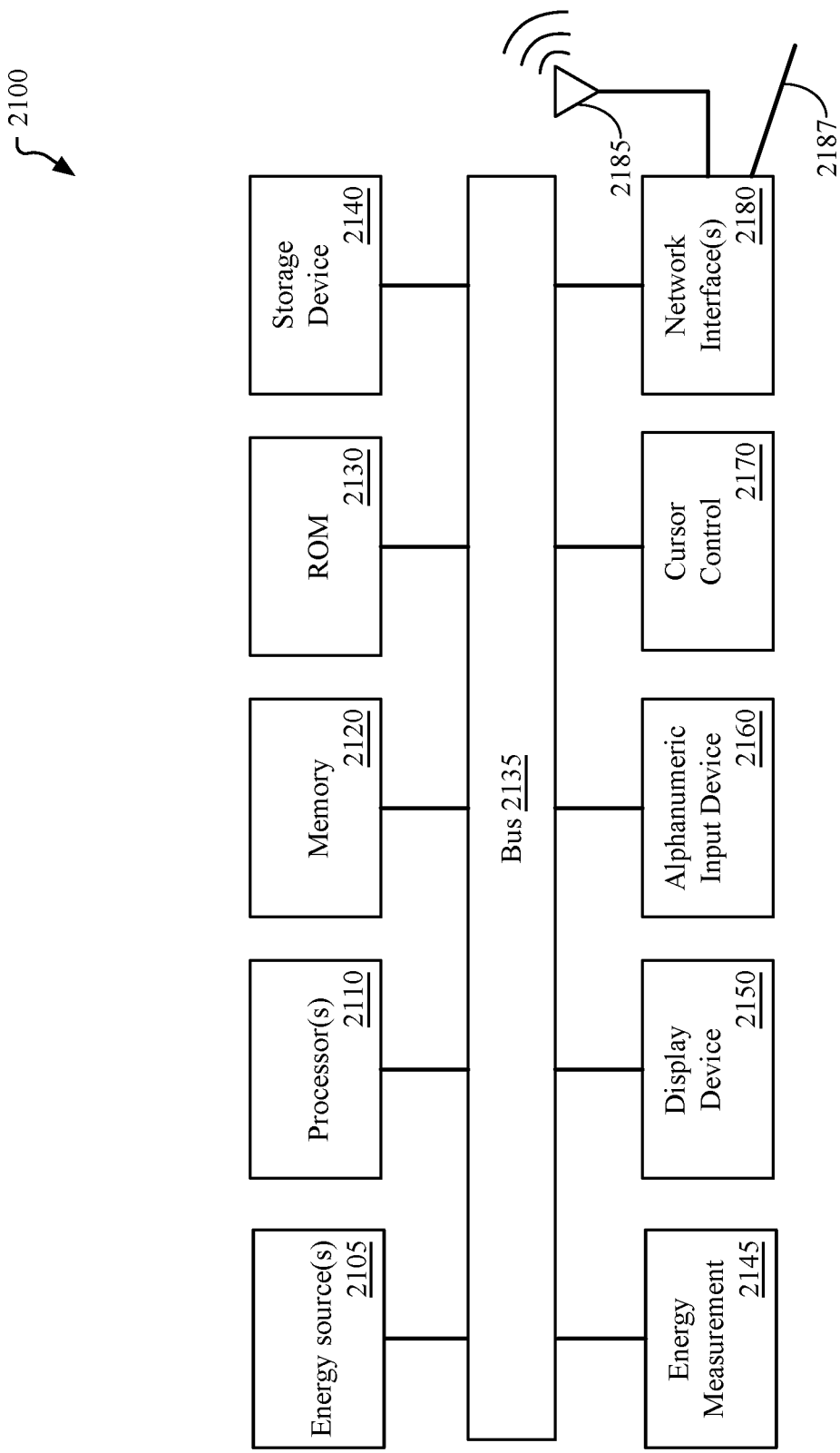
FIG. 21 is a block diagram of a computing system, according to an embodiment.

FIG. 21 is a block diagram of a computing system 2100, according to an embodiment. The illustrated computing system 2100 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 2100 can be used to provide the computing device and/or a server device to which the computing device may connect.

The computing system 2100 includes bus 2135 or other communication device to communicate information, and processor(s) 2110 coupled to bus 2135 that may process information. While the computing system 2100 is illustrated with a single processor, the computing system 2100 may include multiple processors and/or co-processors. The computing system 2100 further may include memory 2120 in the form of random access memory (RAM) or other dynamic storage device coupled to the bus 2135. The memory 2120 may store information and instructions that may be executed by processor(s) 2110. The memory 2120 may also be main memory that is used to store temporary variables or other intermediate information during execution of instructions by the processor(s) 2110.

The computing system 2100 may also include read only memory (ROM) 2130 and/or another data storage device 2140 coupled to the bus 2135 that may store information and instructions for the processor(s) 2110. The data storage device 2140 can be or include a variety of storage devices, such as a flash memory device, a magnetic disk, or an optical disc and may be coupled to computing system 2100 via the bus 2135 or via a remote peripheral interface.

The computing system 2100 may also be coupled, via the bus 2135, to a display device 2150 to display information to a user. The computing system 2100 can also include an alphanumeric input device 2160, including alphanumeric and other keys, which may be coupled to bus 2135 to communicate information and command selections to processor(s) 2110. Another type of user input device includes a cursor control 2170 device, such as a touchpad, a mouse, a trackball, or cursor direction keys to communicate direction information and command selections to processor(s) 2110 and to control cursor movement on the display device 2150. The computing system 2100 may also receive user input from a remote device that is communicatively coupled via one or more network interface(s) 2180.

The computing system 2100 further may include one or more network interface(s) 2180 to provide access to a network, such as a local area network. The network interface(s) 2180 may include, for example, a wireless network interface having antenna 2185, which may represent one or more antenna(e). The computing system 2100 can include multiple wireless network interfaces such as a combination of Wi-Fi, Bluetooth®, near field communication (NFC), and/or cellular telephony interfaces. The network interface(s) 2180 may also include, for example, a wired network interface to communicate with remote devices via network cable 2187, which may be, for example, an Ethernet cable, a coaxial cable, a fiber optic cable, a serial cable, or a parallel cable.

In one embodiment, the network interface(s) 2180 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 2180 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 2100 can further include one or more energy sources 2105 and one or more energy measurement systems 2145. Energy sources 2105 can include an AC/DC adapter coupled to an external power source, one or more batteries, one or more charge storage devices, a USB charger, or other energy source. Energy measurement systems include at least one voltage or amperage measuring device that can measure energy consumed by the computing system 2100 during a predetermined period of time. Additionally, one or more energy measurement systems can be included that measure, e.g., energy consumed by a display device, cooling subsystem, Wi-Fi subsystem, or other frequently used or high-energy consumption subsystem.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the can use an instruction set which may be an extension to an instruction set architecture for a particular type of microprocessor. Accordingly, in an embodiment, the system can provide a hardware-accelerated mechanism for performing cryptographic operations to improve the speed of performing the functions described herein using these instruction sets.

In utilizing the various aspects of the embodiments, it would become apparent to one skilled in the art that combinations or variations of the above embodiments are possible for forming a fan out system in package including multiple redistribution layers. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A method performed by one or more processors of an electronic device to provide separation notifications, the method comprising:
    detecting that the electronic device exits a trusted location;
    in response to the detecting, receiving an indication that at least one accessory device is nearby the electronic device upon exit of the trusted location and storing information on a status of a wireless connection with the at least one accessory device;
    receiving an indication that the electronic device is in transit;
    monitoring the wireless connection for the at least one accessory device nearby the electronic device upon exit of the trusted location; and
    upon detection of a lost wireless connection for the at least one accessory device, send a separation notification.

2. The method of claim 1, further comprising:
    upon detection of the lost wireless connection for the at least one accessory device, setting a first timer for a first defined period of time;
    upon expiry of the first timer, request information on whether the lost wireless connection is reestablished;
    updating information stored on the status of the wireless connection; and
    sending the separation notification unless the lost connection is reestablished.

3. The method of claim 1, further comprising:
    upon detection of a lost wireless connection for the at least one accessory device, monitoring a second geofence for a last known location;
    updating information stored on the status of the wireless connection; and
    upon detection of crossing the second geofence boundary within a second defined period of time, sending the separation notification.

4. The method of claim 1, further comprising:
    monitoring a geofence for a last known location; and
    upon detection of crossing a geofence boundary of a last known location for a threshold period of time, increasing a rate of a beacon scan.

5. The method of claim 4, wherein the rate of the beacon scan is performed every N seconds for M minutes at a higher duty cycle.

6. The method of claim 4, further comprising increasing the rate of the beacon scan to be performed every P times more than an expected rate of packets received from the at least one accessory device.

7. The method of claim 1, further comprising:
    receiving an indication that the electronic device is located in a known location;
    and
    ceasing the monitoring of the wireless connection when the electronic device located within a boundary of the known location.

8. The method of claim 1 wherein the receiving an indication that at least one accessory device is nearby the electronic device comprises at least one of:
    receiving an indication of a wireless connection with the at least one accessory device or receiving beacon data with an indication that the at least one accessory device is nearby.

9. A non-transitory machine-readable medium storing instructions to cause one or more processors of an electronic device to perform operations comprising:
    detecting that the electronic device exits a trusted location;
    in response to the detecting, receiving an indication that at least one accessory device is nearby the electronic device upon exit of the trusted location and storing information on a status of a wireless connection with the at least one accessory device;
    receiving an indication that the electronic device is in transit;

monitoring the wireless connection for the at least one accessory device nearby the electronic device upon exit of the trusted location; and upon detection of a lost wireless connection for the at least one accessory device, send a separation notification.

10. The non-transitory machine-readable medium of claim 9, further comprising:

upon detection of the lost wireless connection for the at least one accessory device, setting a first timer for a first defined period of time;

upon expiry of the first timer, requesting information on whether the lost wireless connection is reestablished;

updating information stored on the status of the wireless connection; and sending the separation notification unless the lost connection is reestablished.

11. The non-transitory machine-readable medium of claim 9, further comprising:

upon detection of a lost wireless connection for the at least one accessory device, monitoring a second geofence for a last known location;

updating information stored on the status of the wireless connection; and upon detection of crossing the second geofence boundary within a second defined period of time, sending the separation notification.

12. The non-transitory machine-readable medium of claim 9, further comprising:

monitoring a geofence for a last known location; and upon detection of crossing a geofence boundary of a last known location for a threshold period of time, increasing a rate of a beacon scan.

13. The non-transitory machine-readable medium of claim 12, wherein the rate of the beacon scan is performed every N seconds for M minutes at a higher duty cycle.

14. The non-transitory machine-readable medium of claim 12, further comprising increasing the rate of the beacon scan to be performed every P times more than an expected rate of packets received from the at least one accessory device.

15. The non-transitory machine-readable medium of claim 9, further comprising:

receiving an indication that the electronic device is located in a known location; and ceasing the monitoring of the wireless connection when the electronic device located within a boundary of the known location.

16. The non-transitory machine-readable medium of claim 9, wherein the receiving an indication that at least one accessory device is nearby the electronic device comprises at least one of:

receiving an indication of a wireless connection with the at least one accessory device or receiving beacon data with an indication that the at least one accessory device is nearby.

17. A data processing system comprising:

a memory to store instructions for execution;

one or more processors to execute the instructions stored in memory, wherein the instructions, when executed cause the one or more processors to:

detect that an electronic device exits a trusted location;

in response to the detecting, receiving an indication that at least one accessory device is nearby the electronic device upon exit of the trusted location and storing information on a status of a wireless connection with the at least one accessory device;

receive an indication that the electronic device is in transit;

monitor the wireless connection for the at least one accessory device nearby the electronic device upon exit of the trusted location; and upon detection of a lost wireless connection for the at least one accessory device, send a separation notification.

18. The data processing system of claim 17, further causing the one or more processors to:

upon detection of a lost wireless connection for the at least one accessory device, set a first timer for a first defined period of time;

upon expiry of the first timer, request information on whether the lost wireless connection is reestablished;

update information stored on the status of the wireless connection; and send the separation notification unless the lost connection is reestablished.

19. The data processing system of claim 17, further causing the one or more processors to:

upon detection of a lost wireless connection for the at least one accessory device, monitor a second geofence for a last known location;

update information stored on the status of the wireless connection; and upon detection of crossing the second geofence boundary within a second defined period of time, send the separation notification.

20. The data processing system of claim 17, further causing the one or more processors to:

monitor a geofence for a last known location; and upon detection of crossing a geofence boundary of a last known location for a threshold period of time, increasing a rate of a beacon scan.

21. The data processing system of claim 20, wherein the rate of the beacon scan is performed every N seconds for M minutes at a higher duty cycle.

22. The data processing system of claim 20, further causing the one or more processors to:

increase the rate of the beacon scan to be performed every P times more than an expected rate of packets received from the at least one accessory device.

23. The data processing system of claim 17, further causing the one or more processors to:

receive an indication that the electronic device is located in a known location; and cease the monitoring of the wireless connection when the electronic device located within a boundary of the known location.

24. The data processing system of claim 17, wherein the receiving an indication that at least one accessory device is nearby the electronic device comprises at least one of:

receive an indication of a wireless connection with the at least one accessory device or receive beacon data with an indication that the at least one accessory device is nearby.

* * * * *